(12) United States Patent
Yoneda et al.

(10) Patent No.: US 9,090,725 B2
(45) Date of Patent: Jul. 28, 2015

(54) AMINO GROUP-CONTAINING POLYMER, METHOD FOR PRODUCING THEREOF, AND DETERGENT COMPOSITION

(75) Inventors: Atsuro Yoneda, Osaka (JP); Daisuke Michitaka, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 282 days.

(21) Appl. No.: 13/821,430

(22) PCT Filed: Sep. 9, 2011

(86) PCT No.: PCT/JP2011/070551
§ 371 (c)(1),
(2), (4) Date: Mar. 7, 2013

(87) PCT Pub. No.: WO2012/033183
PCT Pub. Date: Mar. 15, 2012

(65) Prior Publication Data
US 2013/0172506 A1    Jul. 4, 2013

(30) Foreign Application Priority Data
Sep. 10, 2010 (JP) .................... 2010-203284

(51) Int. Cl.
*C08F 220/28* (2006.01)
*C08F 216/14* (2006.01)
*C11D 3/37* (2006.01)

(52) U.S. Cl.
CPC ............. *C08F 220/28* (2013.01); *C08F 216/14* (2013.01); *C11D 3/3723* (2013.01)

(58) Field of Classification Search
CPC .... C08F 216/14; C08F 220/28; C11D 3/3723
USPC ........................................................ 526/312
See application file for complete search history.

(56) References Cited

U.S. PATENT DOCUMENTS

| 2002/0016430 A1 | 2/2002 | Yamaguchi et al. |
| 2008/0262192 A1* | 10/2008 | Yoneda .................... 528/332 |
| 2011/0183880 A1 | 7/2011 | Yoneda et al. |

FOREIGN PATENT DOCUMENTS

| JP | 2002-3456 | 1/2002 |
| JP | 2002-138115 | 5/2002 |
| JP | 2003-2812 | 1/2003 |
| JP | 2003-34704 | 2/2003 |
| JP | 2005-170977 | 6/2005 |
| JP | 2007-231261 | 9/2007 |
| JP | 2008-1770 | 1/2008 |
| JP | 2008-31252 | 2/2008 |
| JP | 2008-523162 | 7/2008 |
| JP | 2010-132814 | 6/2010 |
| JP | 2011-74096 | 4/2011 |
| JP | 2011-111583 | 6/2011 |
| JP | 2011-116811 | 6/2011 |
| JP | 2011-116813 | 6/2011 |
| WO | WO 2007089001 A1 * | 8/2007 ............. C11D 3/37 |
| WO | WO 2010024468 A1 * | 3/2010 ............. C11D 17/04 |

OTHER PUBLICATIONS

International Search Report issued Dec. 13, 2011 in International (PCT) Application No. PCT/JP2011/070551.

\* cited by examiner

*Primary Examiner* — Ling Choi
*Assistant Examiner* — Chun-Cheng Wang
(74) *Attorney, Agent, or Firm* — Wenderoth, Lind & Ponack, L.L.P.

(57) ABSTRACT

The present invention aims to provide an amino group-containing polymer that is excellent in anti-soil redeposition property during washing and compatibility with surfactants, a method for producing thereof, and a detergent composition containing the amino group-containing polymer. The present invention is the amino group-containing polymer comprising a structural unit derived from an amino group-containing monomer having a specific structure and a structural unit derived from a nonionic monomer and/or an amino group-containing monomer other than the amino group-containing monomer described above.

3 Claims, 2 Drawing Sheets

AMINO GROUP-CONTAINING POLYMER, METHOD FOR PRODUCING THEREOF, AND DETERGENT COMPOSITION

TECHNICAL FIELD

The present invention relates to an amino group-containing polymer and a method for producing thereof, and a detergent composition. Specifically, the present invention relates to an amino group-containing polymer which is useful as a material of detergent compositions and the like and the method for producing thereof, and a detergent composition containing the amino group-containing polymer.

BACKGROUND ART

Conventionally, amino group-containing polymers are used for various fields such as coagulants, flocculants, printing inks, adhesives, detergent additives, soil conditioners (soil reforming agents), flame retardants, additives for shampoos, hair lacquers, soaps, and cosmetics, anion exchange resins, dye mordants and aids for fibers or photo films, and additives used in the manufacture of paper including spreading agents for pigment, paper strengthening agents, emulsifiers, antiseptic agents, softening agents for paper and fabrics, and additives for lubricants. For example, Patent Literature 1 discloses that a polymer represented by the following formula exhibits excellent performances when used for detergents and the like.

[Formula 1]

Also, Patent Literature 2 discloses that a detergent composition that contains a polymeric compound having a structural unit derived from a monomer having a vinylpyridine moiety exhibits high detergency.

CITATION LIST

Patent Literature

Patent Literature 1: JP 2005-170977 A
Patent Literature 2: JP 2008-1770 A

SUMMARY OF INVENTION

Technical Problem

As described above, amino group-containing polymers with various structures have been studied.

Incidentally, recent increase in environmental awareness among consumers establishes washing using leftover bathwater to save water. Such washing has problems such as adhesion of contaminants in the leftover bathwater to fibers during washing or condensation of hard water components due to reheating. Thus, even in water with higher hardness, a property of suppressing stain redeposition on fibers during washing (also referred to as anti-soil redeposition property) is required more strongly than before. Further, liquid detergents in an increasing demand today are concentrated liquid detergents with a surfactant content of 50% or more. Accordingly, a detergent additive is required to be suitable for mixing with such concentrated liquid detergents. This leads to demand for a detergent additive having higher compatibility with a surfactant.

Conventional amino group-containing polymers, however, do not always adequately meet recent strict requirements regarding to properties needed in the water-related applications. There is room for improvement to provide a polymer which fulfills the above-mentioned new needs and can be suitably used for a detergent additive exhibiting high properties.

The present invention is devised in view of the condition described above, and aims to provide an amino group-containing polymer that can exhibit an excellent anti-soil redeposition property during washing and is excellent in compatibility with surfactants and a method for producing thereof, and a detergent composition containing the amino group-containing polymer.

Solution to Problem

The present inventors have studied on polymers that can be suitably used as detergent additives and the like. They thus have found out that, even in water with high hardness, an amino group-containing polymer having a structural unit derived from an amino group-containing monomer having a specific structure and a structural unit derived from a nonionic monomer and/or an amino group containing-monomer other than the above amino group-containing monomer has a significantly favorable anti-soil redeposition property and high compatibility with surfactants. Further, they have found out that the properties are enhanced by adjusting of the amount of each of the structural units in the polymer in a predetermined range, and that such a polymer can be suitably used as a detergent additive to fulfill new needs. Also, they have found that a detergent composition containing such an amino group-containing polymer has significantly high quality and excellent stability because such a detergent composition is especially excellent in dispersibility and less likely to undergo deterioration of properties during long storage and impurity precipitation during storage at low temperatures. The present inventors thereby arrived at the solution to the problems and completed the present invention.

Namely, the present invention relates to an amino group-containing polymer comprising a structural unit (a) derived from a monomer (A) and a structural unit (b) derived from a monomer (B), the monomer (A) being an amino group-containing monomer represented by the formula (1) below, the monomer (B) being a monomer (B-1) and/or a monomer (B-2), the monomer (B-1) being a nonionic monomer, the monomer (B-2) being an amino group-containing monomer other than the monomer (A), the amino group-containing polymer containing the structural unit (a) in an amount of 1% to 99% by mass and the structural unit (b) in an amount of 1% to 99% by mass, for 100% by mass of the total of structural units derived from all monomers forming the amino group-containing polymer.

[Chem. 2]

(1)

In the formula (1), $R^1$ represents a hydrogen atom or a methyl group. $R^2$ represents a methylene group, an ethylene group, or a direct bond. Either of $Y^1$ and $Y^2$ represents a hydroxyl group and the other represents a structure represented by the formula (2) or (3).

[Chem. 3]

In the formula (2), $R^3$, $R^4$, and $R^5$ are the same as or different from each other, and each represents a hydrogen atom or an organic group containing 1 to 20 carbon atoms. Here, $R^3$ and $R^4$ may be bonded to each other to form a cyclic structure. $X^{1-}$ represents a counter anion. In the formula (3), $R^6$ and $R^7$ are the same as or different from each other, and each represents a hydrogen atom or an organic group containing 1 to 20 carbon atoms. Here, $R^6$ and $R^7$ may be bonded to each other to form a cyclic structure.

The present invention also relates to a method for producing an amino group-containing polymer comprising a step of polymerizing a monomer (A) and a monomer (B), the monomer (A) being an amino group-containing monomer represented by the formula (1), the monomer (B) being a monomer (B-1) and/or a monomer (B-2), the monomer (B-1) being a nonionic monomer, the monomer (B-2) being an amino group-containing monomer other than the monomer (A), the method using the monomer (A) in an amount of 1% to 99% by mass and the monomer (B) in an amount of 1% to 99% by mass, for 100% by mass of the total of all monomers to be used.

The present invention also relates to a detergent composition comprising the amino group-containing polymer.

In the following, the present invention is described in detail. Here, a combination of two or more of the preferable embodiments of the present invention described by paragraphs below is also a preferable embodiment of the present invention.

<Amino Group-Containing Polymer><
<Amino group-containing monomer (A)>

The amino group-containing polymer contains a structural unit (a) derived from a monomer (A). The monomer (A) is an amino group-containing monomer represented by the formula (1).

In the formula (1), "$R^2$ is a direct bond" means that "$H_2C=C(R^1)$—$R^2$—O—" in the formula (1) is "$H_2C=C(R^1)$—O—". Here, if $R^1$ is a $CH_3$ group and $R^2$ is a $CH_2$ group, "$H_2C=C(R^1)$—$R^2$—O—" represents a methallyl group; if $R^1$ is a $CH_3$ group and $R^2$ is a $CH_2CH_2$ group, it represents an isoprenyl group; if $R^1$ is $CH_3$ group and $R^2$ is a direct bond, it represents an isopropenyl group; if $R^1$ is a hydrogen atom and $R^2$ is a $CH_2$ group, it represents an allyl group; if $R^1$ is a hydrogen atom and $R^2$ is a $CH_2CH_2$ group, it represents a butenyl group; and if $R^1$ is a hydrogen atom and $R^2$ is a direct bond, it represents a vinyl group.

Preferable examples of the group having a polymerizable carbon-carbon double bond in the amino group-containing monomer (A), that is, "$H_2C=C(R^1)$—$R^2$—", include isoprenyl, methallyl, allyl, and vinyl groups. From the viewpoint of improvement of polymerizability, isoprenyl, methallyl, and allyl groups are more preferred, and isopropenyl and methallyl groups are particularly preferred.

Either of $Y^1$ and $Y^2$ in the formula (1) represents a hydroxyl group, and the other represents a structure represented by the formula (2) or the formula (3). These structures of the formula (2) or the formula (3) significantly improve the dispersibility of such as inorganic particles and contaminants in the amino group-containing polymer of the present invention.

$R^3$, $R^4$, and $R^5$ in the formula (2) are the same as or different from each other, and each represents a hydrogen atom or an organic group containing 1 to 20 carbon atoms. $R^6$ and $R^7$ in the formula (3) are the same as or different from each other, and each represents a hydrogen atom or an organic group containing 1 to 20 carbon atoms.

The organic group containing 1 to 20 carbon atoms is not particularly limited as long as it has 1 to 20 carbon atoms in total. Preferably, the organic group is at least one selected from the group consisting of alkyl, aryl, and alkenyl groups.

Also, the organic group containing 1 to 20 carbon atoms may be an unsubstituted group or a group in which one or two or more of the hydrogen atoms is/are substituted with one or two or more of the other organic groups. In this case, examples of the another organic group include alkyl (if the organic groups represented by $R^3$, $R^4$, and $R^5$ are alkyl groups, the organic group substituted corresponds to an unsubstituted alkyl group as a whole), aryl, alkenyl, alkoxy, hydroxyl, acyl, ether, amido, ester, ketone, carboxyl, salts of a carboxyl group, and sulfonic acid groups, and salts of a sulfonic acid group, and the like.

In the organic group containing 1 to 20 carbon atoms, the carbon number is preferably 1 to 8, more preferably 1 to 5, and further preferably 1 or 2. If the carbon number is within the range, the amino group-containing monomer (A) can be obtained in high yield. This enhances the polymerizability of the monomer and the purity of the polymer to be obtained. Also, the polymer to be obtained can have an enhanced anti-soil redeposition property.

Specific examples of the organic group containing 1 to 20 carbon atoms include: alkyl groups such as methyl, ethyl, isopropyl, n-propyl, n-butyl, isobutyl, octyl, lauryl, stearyl, cyclohexyl, and 2-ethylhexyl groups; alkenyl groups such as butylene, octylene, and nonylene groups; aryl groups such as phenyl, benzyl, phenethyl, 2,3- or 2,4-xylyl, mesityl, and naphthyl groups; and groups prepared by substituting part of the hydrogen atoms in any of the above groups with an alkoxy group, a carboxyester group, an amino group, an amido group, a hydroxyl group, a carboxyl group, a salt of a carboxyl group, a sulfonic acid group, a salt of a sulfonic acid group, or the like (e.g. hydroxyethyl group and hydroxypropyl group). Preferred among these are methyl and ethyl groups in terms of enhancement of the anti-soil redeposition property of the polymer to be obtained.

$R^3$ and $R^4$ in the formula (2) may be bonded to each other, and $R^6$ and $R^7$ in the formula (3) may be bonded to each other to form a cyclic structure. The cyclic structure formed of a nitrogen atom, $R^3$, and $R^4$ (or $R^6$, and $R^7$) is preferably a three- to seven-membered ring. Namely, the total carbon number of $R^3$ and $R^4$ (or $R^6$ and $R^7$) is preferably 2 to 6.

If the amino group-containing monomer (A) contains a quaternized nitrogen atom, a counter anion $X^{1-}$ is present near the quaternized nitrogen atom.

Type of the counter anion $X^{1-}$ is not particularly limited, for example, is preferably a halide ion, an alkyl sulfate ion, or an organic acid ion.

Specific examples of the halide ion include chloride, bromide, iodide, fluoride ions, and the like. Preferred among these are chloride, bromide, and iodide ions, and a chloride ion is more preferred.

Specific examples of the alkyl sulfate ion include a methyl sulfate ion, an ethyl sulfate ion, and the like. Preferred among these is a methyl sulfate ion.

Examples of a preferred organic acid ion include an acetate ion ($CH_3COO^-$) and a propionate ion ($CH_3CH_2COO^-$).

The amino group-containing polymer of the present invention comprises a structural unit (a) derived from the monomer (A). The structural unit (a) has a structure which is similar to the structure of the monomer (A) and which has a carbon-carbon single bond in place of the carbon-carbon double bond. The structural unit (a) is represented by the formula (4) below. Here, $R^1$, $R^2$, $Y^1$, and $Y^2$ are defined as described above.

[Chem. 4]

(4)

The phrase "the amino group-containing polymer comprises a structural unit (a) derived from the monomer (A)" herein means that the resulting polymer contains the structural unit represented by the formula (4). That is, "the structural unit (a) derived from the monomer (A)" of the present invention may be not only one introduced into the polymer by copolymerization of the monomer (A) previously prepared with other monomer components, but also one prepared by a method in which the formation step is performed before and after the polymerization reaction. For example, the structural unit (a) may be provided by the steps of: forming a main chain part of the amino group-containing polymer by copolymerization; and introducing of a side chain having a specific structure to the main chain part.

The amount of the structural unit (a) in the amino group-containing polymer is not less than 1% by mass but not more than 99% by mass for 100% by mass of the total of structural units derived from all monomers forming the amino group-containing polymer (that is, the total of the structural unit (a) and structural units (b) and (e) described below). If the amount of the structural unit (a) is within the range, remarkable enhancing effects for an anti-soil redeposition property and for compatibility with surfactants of the polymer can be obtained. The amount of the structural unit (a) is preferably not less than 5% by mass but not more than 90% by mass, more preferably not less than 10% by mass but not more than 80% by mass, and further preferably not less than 15% by mass but not more than 70% by mass.

Here, in calculation of the mass ratio (% by mass) of the structural unit (a) to the total of the structural units derived from all the monomers or in calculation of the mass ratio of the monomer (A) to the total of all the monomers, the mass of the counter anion is not considered (included).

The amino group-containing polymer may contain only one type of monomer (a) or two or more types of monomer (a).

The structural unit (a) preferably contains a structural unit represented by the formula (2). This is because such a structural unit (a) is highly effective in enhancing an anti-soil redeposition property.

The amount of the structural unit represented by the formula (2) is preferably not less than 1% by mass but not more than 99% by mass for 100% by mass of the total of the structural unit derived from all the monomers forming the amino group-containing polymer.

<Method for Producing Amino Group-Containing Monomer (A)>

The method for preparing the amino group-containing monomer (A) is not particularly limited, and the amino group-containing monomer (A) can be prepared by any appropriate method. For example, the amino group-containing monomer (A) is preferably produced by any of the production methods (1) to (6) described below because these methods enable production of the amino group-containing monomer (A) in high yield.

Production method (1): a method including the step of (step 1) reacting a glycidyl ether group-containing monomer represented by the formula (5):

[Chem. 5]

(5)

(wherein $R^1$ and $R^2$ are defined as described above) with a tertiary amine salt.

Production method (2): a method including the steps of: (step 2-1) reacting a glycidyl ether group-containing monomer represented by the formula (5) with a secondary amine; and (step 2-2) reacting the reaction product obtained in the step 2-1 with a quaternizing agent.

Production method (3): a method including the step of (step 3) reacting a glycidyl ether group-containing monomer represented by the formula (5) with at least one selected from the group consisting of ammonia, a primary amine, and a secondary amine.

Production method (4): a method including the step of (step 4) reacting a halide represented by the formula (6):

[Chem. 6]

(6)

(wherein $R^1$ and $R^2$ are defined as described above and $X^2$ is a halogen atom) with a tertiary amine.

Production method (5): a method including the step of (step 5) reacting a halide represented by the formula (6) with at least one selected from the group consisting of ammonia, a primary amine, and a secondary amine.

Production method (6): a method including the step of (step 6) reacting a hydroxyl group-containing monomer represented by the formula (7):

[Chem. 7]

(7)

(wherein R¹ and R² are defined as described above) with a glycidyltrialkylammonium salt.

The production methods (1) to (6) are further described below.

—Production Methods (1), (2), and (3)—

The glycidyl ether group-containing monomer represented by the formula (5) in the production methods (1), (2), and (3) may be a commercially available one as it is or purified before use. The monomer may also be produced by a method including the step (step A) of reacting a hydroxyl group-containing monomer represented by the formula (7) with an epihalohydrin.

Examples of the hydroxyl group-containing monomer represented by the formula (7) to be preferably used include (meth)allyl alcohol and isoprenol. These monomers give high purity to the amino group-containing monomer (A) to be obtained.

The epihalohydrin used in the step (A) is preferably one represented by the formula (8) below. Here, X' in the formula represents a halogen atom.

[Chem. 8]

(8)

Specific examples of the epihalohydrin include epichlorohydrin, epibromohydryn, and epiiodohydrin. Preferable among these is epichlorohydrin because it is inexpensive industrially.

The reaction step in the step (A) is preferably performed in the presence of an alkali compound. Also, it is suitable to perform the reaction optionally in the presence of an alkali compound and a phase transfer catalyst and/or solvent.

The alkali compound is not particularly limited, and is preferably, for example, alkali metal hydroxides such as sodium hydroxide and potassium hydroxide.

The amount of the alkali compound is preferably set such that the molar ratio of the hydroxyl group (in hydroxyl value) in the hydroxyl group-containing monomer represented by the formula (7) to the alkali compound is 15/1 to 1/15 [(hydroxyl group)/(alkali compound)]. The molar ratio is more preferably 5/1 to 1/5, and further preferably 3/1 to 1/3.

The alkali compound may be added in the reaction system as it is or may be used in the form of an aqueous solution. In the case of using the compound in the form of aqueous solution, the reaction may be performed while removing water (including by-product water produced during the reaction).

The phase transfer catalyst is not particularly limited, and examples thereof include: quaternary ammonium salts such as tetramethylammonium chloride, tetrabutylammonium chloride, tetraoctylammonium chloride, benzyltrimethylammonium chloride, triethylammonium chloride, and triethylammonium bromide; phosphonium salts such as tetrabutylphosphonium chloride and tetrabutylphosphonium bromide; and crown ethers such as 15-crown-5 and 18-crown-6.

In the step A, the amount of the epihalohydrin is preferably set such that the molar ratio of the hydroxyl group (in hydroxyl value) in the hydroxyl group-containing monomer represented by the formula (7) to the epihalohydrin is 1/1 to 1/30 [(hydroxyl group)/(epihalohydrin)]. If the molar ratio is out of the range, cross-linkable component may be generated. This may result in gelation during polymerization. The molar ratio is more preferably 1/1 to 1/10, and further preferably 1/1 to 1/5.

From the viewpoint of efficient progress of the reaction and volume efficiency, the reaction in the step A is preferably performed in the absence of a solvent. The reaction, however, may be performed in the presence of a solvent. After the step A, purification steps such as distillation, evaporation, and desalination may be carried out.

The solvent is preferably one which less negatively affects the reaction. Examples of a solvent that can be used include: hydrocarbons such as hexane, octane, cyclohexane, and toluene; ethers such as diethylether and tetrahydrofuran; ketones such as acetone and methyl ethyl ketone; and chlorinated hydrocarbons such as dichloromethane.

The tertiary amine salt to be used in the production method (1) is preferably one represented by the formula (9). Here, R³, R⁴, R⁵, and X¹⁻ are defined as described above.

[Chem. 9]

(9)

Specific examples of the tertiary amine salt include: hydrochlorides, hydrobromides, hydroiodides, nitrates, acetates, perchlorates, and paratoluenesulfonates of tertiary amines such as trimethylamine, dimethylethylamine, dimethylisopropylamine, dimethyl-n-propylamine, dimethylcyclohexylamine, triethylamine, triisopropylamine, tri-n-propylamine, tributylamine, trilaurylamine, tristearylamine, tricyclohexylamine, tri-2-ethylhexylamine, triethanolamine, and tris(2-hydroxypropyl)amine. Preferred among these are trimethylamine hydrochloride, triethylamine hydrochloride, and dimethylethylamine hydrochloride because these tertialy amine salt enable production of the amino group-containing monomer (A) in high yield.

With regard to the amount of the tertiary amine salt in the production method (1), the molar ratio of the tertiary amine salt to the number of moles of the glycidyl group in the glycidyl ether group-containing monomer represented by the formula (5) is preferably 2/1 to 1/2 [(tertiary amine salt)/(glycidyl group)]. The molar ratio is more preferably 1.5/1 to 1/1.5, and further preferably 1.3/1 to 1/1.3.

The tertiary amine salt may be used in the form of an aqueous solution. In this case, the amount of the tertiary amine salt in the solution is preferably 5% by mass or more. If the content of the tertiary amine salt is less than 5% by mass, the amino group-containing monomer (A) may be obtained by the reaction with reduced selectivity. The aqueous solution more preferably contains 10% by mass or more of the tertiary amine salt, and further preferably 15% by mass or more of the tertiary amine salt.

The secondary amine to be used in the production methods (2) and (3) (and the production method (5) described below) is preferably one represented by the formula (10) below. Here, $R^6$ and $R^7$ in the formula are defined as described above.

[Chem. 10]

(10)

Specific examples of the secondary amine include: dialkylamines such as dimethylamine, methylethylamine, diethylamine, diisopropylamine, di-n-propylamine, di-n-butylamine, dioctylamine, dilaurylamine, distearylamine, dicyclohexylamine, and di-2-ethylhexylamine; dialkanolamines such as diethanolamine and bis(2-hydroxypropyl) amine; and cyclic amines such as morpholine and pirrole. Preferable among these are dimethylamine, methylethylamine, diethylamine, and diethanolmine because these amines enable production of the amino group-containing monomer (A) in high yield.

With regard to the amount of the secondary amine in the production method (2), the molar ratio of the amine to the number of the moles of the glycidyl group in the glycidyl ether group-containing monomer represented by the formula (5) is preferably 2/1 to 1/2 [(amine)/(glycidyl group)]. The molar ratio is more preferably 1.5/1 to 1/1.5, and further preferably 1.3/1 to 1/1.3.

Examples of the quaternizing agent to be used in the production method (2) include: alkyl halides such as methyl chloride, ethyl chloride, methyl bromide, ethyl bromide, methyl iodide, and ethyl iodide; benzyl halides such as benzyl chloride, benzyl bromide, and benzyl iodide; dialkyl sulfates such as dimethyl sulfate and diethyl sulfate; and alkyl sulfonates such as methyl paratoluenesulfonate and ethyl paratoluenesulfonate. Preferable among these are methyl chloride, benzyl chloride, and dimethyl sulfate because these are easily available industrially.

With regard to the amount of the quaternizing agent in the production method (2), the molar ratio of the quaternizing agent to the number of moles of the amino group in the reaction product obtained in the step 2-1 is preferably 2/1 to 1/2 [(quaternizing agent)/(amino group)]. The molar ratio is more preferably 1.5/1 to 1/1.5, and further preferably 1.3/1 to 1/1.3.

Specific examples of the primary amine to be used in the production method (3) (and the production method (5) described below) include: alkyl amines such as methylamine, ethylamine, isopropylamine, n-propylamine, n-butylamine, octylamine, laurylamine, stearylamine, cyclohexylamine, and 2-ethylhexylamine; and alkanol amines such as ethanol amine and 2-hydroxypropylamine. Preferred among these are methylamine, ethylamine, and ethanol amine because these amines enable production of the amino group-containing monomer (A) in high yield.

With regard to the amount of at least one selected from the group consisting of ammonia, a primary amine, and a secondary amine to be used in the production method (3), the molar ratio of the at least one selected from the group consisting of ammonia, a primary amine, and a secondary amine to the number of the moles of the glycidyl group in the glycidyl ether group-containing monomer represented by the formula (5) is preferably 2/1 to 1/2 [total of ammonia, primary amine, and secondary amine)/(glycidyl group)]. The molar ratio is more preferably 1.5/1 to 1/1.5, and further preferably 1.3/1 to 1/1.3.

The reactions in the steps 1 to 3 in the production methods (1) to (3) are preferably performed in the absence of a solvent from the viewpoint of efficient progress of the reactions and volume efficiency. The reactions, however, may be performed in the presence of a solvent.

The solvent is preferably one which less negatively affects the reactions, and examples of the solvent that can be used include: water; alcohols such as ethanol and isopropanol; ethers such as diethyl ether and tetrahydrofulane; and ketones such as acetone and methylethylketone.

—Production Methods (4) and (5)—

The tertiary amine to be used in the production method (4) is preferably one represented by the formula (11). Here, $R^3$, $R^4$, and $R^5$ in the formula are defined as described above.

[Chem. 11]

(11)

Specific examples of the tertiary amines include: trialkylamines such as trimethylamine, dimethylethylamine, dimethylisopropylamine, dimethyl-n-propylamine, dimethylcyclohexylamine, triethylamine, trisopropylamine, tri-n-propylamine, tributylamine, trilaurylamine, tristearylamine, tricyclohexylamine, and tri-2-ethylhexylamine; and trialkanolamines such as triethanolamine and tris(2-hydroxypropyl)amine, and the like. Preferred among these are trimethylamine, dimethylethylamine, triethylamine, and triethanolamine because the amino group-containing monomer (A) can be produced in high yield.

With regard to the amount of the tertiary amine to be used in the production method (4), the molar ratio of the tertiary amine to the number of moles of the halogen group in the halide represented by the formula (6) is preferably 2/1 to 1/2 [(amine)/(halogen group)]. The molar ratio is more preferably 1.5/1 to 1/1.5, and further preferably 1.3/1 to 1/1.3.

With regard to the amount of at least one selected from the group consisting of ammonia, a primary amine, and a secondary amine in the production method (5), the molar ratio of the at least one selected from the group consisting of ammonia, a primary amine, and a secondary amine to the number of the moles of the halogen group in the halide represented by the formula (6) is preferably 2/1 to 1/2 [(total of ammonia, primary amine, and secondary amine)/(halogen group)]. The molar ratio is more preferably 1.5/1 to 1/1.5, and further preferably 1.3/1 to 1/1.3.

In the production methods (4) and (5), a step of washing the halide represented by the formula (6) may be carried out before the steps 4 and 5.

Also, in the reactions in the steps 4 and 5, the pH is optionally adjusted. The pH may be adjusted prior to or during the reaction and is preferably adjusted by adding of an alkali compound. Examples of the alkali compound include hydroxides of alkali metals such as sodium hydroxide and potassium hydroxide, and the like.

The halide represented by the formula (6) may be produced by, for example, a method including the step (step B) of reacting a hydroxyl group-containing monomer represented by the formula (7) with an epihalohydrin.

The reaction in the step B is preferably performed in the presence of a catalyst. The catalyst may be an acid or a base, and is preferably an acid. The acid may be a Lewis acid or a Broensted acid, and is preferably a Lewis acid. The Lewis acid may be a so-called Lewis acid, and examples thereof include boron trifluoride, tin tetrachloride, tin dichloride, zinc chloride, iron (III) chloride, aluminum chloride, titanium tetrachloride, magnesium chloride, and antimony pentachloride, and the like.

The amount of the catalyst is generally 0.0001 to 0.1 (mol), provided that the amount of the hydroxyl group (in hydroxyl value) in the hydroxyl group-containing monomer represented by the formula (7) is regarded as 1 (mol). If the amount of the catalyst is too small, the catalytic effect is insufficiently obtained. Too large an amount of the catalyst shows no additional effect and is economically disadvantageous. The amount is preferably 0.0005 to 0.05 (mol), and more preferably 0.001 to 0.03 (mol).

The amount of the epihalohydrin in the step B is generally 1 to 30 (mol), provided that the amount of the hydroxyl group (in hydroxyl value) in the hydroxyl group-containing monomer represented by the formula (7) is regarded as 1 (mol). If the amount is out of the range, cross-linkable component may be generated. This may results in gelation during polymerization. The amount is preferably 1 to 10 (mol), and more preferably 1 to 5 (mol).

—Production Method (6)—

The glycidyltrialkylammonium salt to be used in the production method (6) is preferably one represented by the formula (12). Here, $R^3$, $R^4$ and $R^5$ in the formula are defined as described above. $X^{4-}$ represents an ion of a halogen atom.

[Chem. 12]

(12)

Specific examples of the glycidyltrialkylammonium salt include: glycidyltrimethylammonium chloride, glycidyltriethylammonium chloride, glycidyltrimethylammonium bromide, and glycidyltriethylammonium bromide. Preferred among these is glycidyltrimethylammonium chloride because it is easily available industrially.

The reaction in the step 6 is performed optionally in the presence of a catalyst. Examples of the catalyst to be used in the reaction include: alkali metal salts such as sodium hydroxide, potassium hydroxide, potassium carbonate, and sodium carbonate; and quaternary ammonium salts such as tetramethylammonium chloride, tetrabutylammonium chloride, tetraoctylammonium chloride, benzyltrimethylammonium chloride, triethylammonium chloride, and triethylammonium bromide.

The amount of the catalyst is generally 0.0001 to 0.3 (mol), provided that the amount of the hydroxyl group (in hydroxyl value) in a hydroxyl group-containing monomer represented by the formula (7) is regarded as 1 (mol). If the amount of the catalyst is too small, the catalytic effect is insufficiently obtained. Too large an amount of the catalyst shows no additional effect, and is economically disadvantageous. The amount is preferably 0.001 to 0.2 (mol), and more preferably 0.005 to 0.1 (mol).

The reaction in the step 6 is preferably performed in the absence of a solvent from the viewpoint of efficient progress of the reaction and volume efficiency. The reaction, however, may be performed in the presence of a solvent.

The solvent is preferably one which less negatively affects the reaction, and solvents that can be used in the steps 1 to 3 can also be used in this step.

With regard to the amount of the glycidyltrialkylammonium salt in the production method (6), the molar ratio of the glycidyltrialkylammonium salt to the hydroxyl group (in hydroxyl value) in the hydroxyl group-containing monomer represented by the formula (7) is preferably 5/1 to 1/5 [(glycidyltrialkylammonium salt)/(hydroxyl group)]. The molar ratio is more preferably 3/1 to 1/3, and further preferably 1.5/1 to 1/1.5.

The reactions in the steps in the production methods (1) to (6) are preferably performed at a temperature which causes no problem on stirring. Specifically, the reaction temperature is preferably 0° C. to 200° C., more preferably 15° C. to 150° C., and further preferably 30° C. to 100° C. The reaction time is preferably 0.1 to 50 hours, more preferably 0.5 to 30 hours, and further preferably 1 to 15 hours. The reactions may be performed in the air or in an inactive gas. Also, the reactions may be performed under any of reduced pressure, atmospheric pressure, and increased pressure.

Though the amino group-containing monomer (A) is favorably produced by any of the production methods (1) to (6), a purification step may be optionally carried out. The step of purification including extraction, washing, and the like enables reduction in the amount of a cross-linkable component that is responsible for gelation during polymerization.

If the amino group-containing monomer (A) has the structure of the formula (2), the counter anion ($X^{1-}$) in the monomer can be converted into a desired anion species by an ion exchange method after the monomer is produced by the above method. However, it is easier and preferred to introduce a desired anion species by appropriately selecting a material to be used in each production method. That is, in the production method (1), an anion of a tertiary amine salt can be introduced as the counter anion. In the production method (2), the counter anion can be introduced by a quaternizing agent. In the production method (6), a counter anion of a glycidyltrialkylammonium salt can be introduced as a counter anion in the amino group-containing monomer (A).

<Monomer (B)>

The amino group-containing polymer of the present invention also contains a structural unit (b) derived from a monomer (B).

The monomer (B) is a monomer (B-1) and/or (B-2). In other word, the monomer (B) is a monomer (B-1), a monomer (B-2), or a mixture of a monomer (B-1) and a monomer (B-2).

The monomer (B-1) is a nonionic monomer, and the monomer (B-2) is an amino-group containing monomer other than the monomer (A).

Here, the polymer may contain one kind or two or more kinds of the structural unit(s) (b).

The monomer (B) in the amino group-containing polymer of the present invention mainly serves to place the structure derived from the amino group-containing monomer (A) into a proper position in the polymer. Also, the monomer (B) serves as a bond for monomers (A), which are poor in homopolymerizability, to adjust the molecular weight and the molecular distribution properly. The monomer (B) therefore is required to have good copolymerizability with the monomer (A) and to have homopolymerizability by itself. Also, the structure derived from the monomer (B) is required not to inhibit the effects of the structure derived from the monomer (A).

—Nonionic Monomer (B-1)—

The nonionic monomer (B-1) is a non-ionic monomer, and specific examples thereof include: alkyl (meth)acrylate monomers such as methyl (meth)acrylate, ethyl (meth)acrylate, butyl (meth)acrylate, 2-ethylhexyl (meth)acrylate, and dodecyl (meth)acrylate; hydroxyalkyl (meth)acrylate monomers such as hydroxyethyl (meth)acrylate, 2-hydroxyethyl (meth)acrylate, hydroxybutyl (meth)acrylate, 2-hydroxybutyl (meth)acrylate, 4-hydroxybutyl (meth)acrylate, α-hydroxymethylethyl (meth)acrylate, hydroxypentyl (meth)acrylate, hydroxyneopentyl (meth)acrylate, and hydroxyhexyl (meth)acrylate; vinylaryl monomers such as styrene, indene, and vinylaniline; alkenes such as isobutylene; vinyl carboxylates such as vinyl acetate; N-vinyl cyclic amide monomers such as N-vinyl pyrrolidone, N-vinyl formamide, N-vinyl acetamide, N-vinyl-N-methylformamide, N-vinyl-N-methylacetamide, and N-vinyl oxazolidone; acrylamides such as (meth)acrylamide and (meth)isopropylacrylamide; and polyalkylene glycol chain-containing monomers such as (meth)acrylates of alkoxy polyalkylene glycols, and the like. Preferable among these are alkyl (meth)acrylate monomers, hydroxyalkyl (meth)acrylate monomers, vinyl aryl monomers, vinyl carboxylates, N-vinyl cyclic amide monomers, and acrylamides because these have good copolymerizability with the monomer (A) and give a good anti-soil redeposition property to the polymer to be obtained.

Here, the monomer represented by the formula (7) (including a monomer in which the terminal hydroxyl group thereof is modified by an organic group) is excluded from the monomer (B). This is because the monomer represented by the formula (7) shows insufficient copolymerizability in binary copolymerization with the monomer (A) and is difficult to use for production of the amino group-containing polymer of the present invention.

—Amino Group-Containing Monomer (B-2) Other than the Monomer (A)—

The monomer (B-2) is a monomer having a polymerizable carbon-carbon unsaturated double bond and a primary to quaternary amino group and/or a salt thereof (excluding a monomer corresponding to the monomer (A)). Examples thereof include: vinyl cyclic amine monomers having a cyclic amine structure such as vinyl pyridine, vinyl imidazole, morpholine, and vinyl pyrrole; aminoalkyl (meth)acrylates such as dimethylaminoethyl acrylate, dimethylaminoethyl methacrylate, dimethylaminopropyl acrylate, and aminoethyl methacrylate; allylamines such as diallyl amine and diallyl dimethylamine; and monomers obtained by quaternizing the amino group in these monomers, and the like.

Preferable among these are vinyl cyclic amine monomers, aminoalkyl (meth)acrylates, allylamines, vinyl carboxylates, N-vinyl cyclic amide monomers, and acrylamides because these have good copolymerizbaility with the monomer (A) and give a good anti-soil redeposition property to the polymer to be obtained.

Here, the monomer (B-2) having a quaternized amino group can be obtained by quaternizing a monomer (B-2) having a primary to tertiary amino group using a known quaternizing agent, for example. The known quaternizing agent may be an alkyl halide or a dialkyl sulfate, or the like.

In the amino group-containing polymer, the amount of the structural unit (b) is not less than 1% by mass but not more than 99% by mass for 100% by mass of the total of the structural units derived from all the monomers forming the amino-group containing polymer (that is, the total of the structural unit (a), the structural unit (b), and the structural unit (e) described below). If the amount of the structural unit (b) is in the range, the molecular weight of the polymer to be obtained and the polymerizability of the monomer (A) can be properly controlled. Thereby, such an amount of the structural unit (b) allows favorable dispersibility of contaminant particles or pigment and a favorable anti-soil redeposition property in the polymer of the present invention. Also, the polymer to be obtained can have significantly improved compatibility with surfactants. The amount of the structural unit (b) is preferably not less than 10% by mass but not more than 95% by mass, more preferably not less than 20% by mass but not more than 90% by mass, and further preferably not less than 30% by mass but not more than 85% by mass.

Here, if the structural unit (b) is a structural unit derived from the monomer (B-2), the mass ratio of the structural unit (b) to the total of the structural units derived from all the monomers and the mass ratio of the monomer (B-2) to the total of all the monomers are calculated as the mass ratio of the corresponding unneutralized amine. For example, if the monomer (B-2) is vinylamine hydrochloride, the mass ratio (% by mass) of vinylamine, which is the corresponding unneutralized amine, is calculated. In addition, when the mass ratio (% by mass) of a monomer having a quaternized amino group or a structural unit derived therefrom is calculated, the mass of the counter anion is not considered (included) in the calculation.

<Other Monomer (E)>

The amino group-containing polymer of the present invention may contain a structural unit (e) derived from other monomer (E) (a monomer other than the monomers (A) and (B)). Here, the polymer may contain one kind or two or more kinds of structural unit (e).

The structural unit (e) derived from the other monomer (E) is a structural unit having the same structure as the other monomer (E), except that it has a single bond in place of the unsaturated double bond. "The amino group-containing polymer of the present invention contains a structural unit (e) derived from the other monomer (E)" herein means that the resulting polymer has a structural unit having the same structure as the other monomer (E), except that the structural unit has a single bond in place of an unsaturated double bond.

Examples of the other monomer (E) include a monomer having the structure represented by the formula (7) (including one in which the terminal hydroxyl group is modified by an organic group), a monomer containing a carboxyl group, a monomer containing a sulfonic acid group, and a monomer containing a phosphate group.

The amount of the structural unit (e) derived from the other monomer (E), which is an optional component that may be contained in the amino group-containing polymer of the present invention, is preferably 0% to 20% by mass for 100% by mass of the total of the structural units derived from all the monomers forming the amino group-containing polymer (that is, the total of the structural units (a), (b) and (e)), and more preferably 0% to 10% by mass.

Here, if the structural unit (e) is a structural unit derived from an acid group-containing monomer, the mass ratio (% by mass) of the structural unit (e) to the total of the structural units derived from all the monomers is calculated in terms of the corresponding acid. Also, the mass ratio (% by mass) of the acid group-containing monomer to the total of all the monomers is calculated in terms of the corresponding acid.

<Other Physical Properties of Amino Group-Containing Polymer>

The amino group-containing polymer of the present invention may contains the structural units (a) and (b), and optionally the unit (e), at the specific ratio described above.

The weight average molecular weight of the amino group-containing polymer is appropriately set, and is not particularly limited. Specifically, the weight average molecular weight of the amino group-containing polymer is preferably 2,000 to 200,000, more preferably 3,000 to 100,000, and further preferably 4,000 to 60,000. If the weight average molecular weight is within the range, the anti-soil redeposition property tends to be further improved.

The number average molecular weight of the amino group-containing polymer is preferably 1,000 to 100,000, more preferably 1,500 to 50,000, and further preferably 2,000 to 25,000. If the number average molecular weight is within the range, the anti-soil redeposition property tends to be further improved.

Here, in the present Description, the weight average molecular weight and the number average molecular weight are values measured by GPC (gel permeation chromatography). These can be measured with a device and under conditions described in examples below.

The amino group-containing polymer of the present invention has a high anti-soil redeposition property, and preferably have an anti-soil redeposition rate of 75% or higher, and more preferably 76% or higher.

Here, the anti-soil redeposition rate may be measured in the same manner as in examples described blow.

[Amino Group-Containing Polymer Composition]

The amino group-containing polymer of the present invention may form an amino group-containing polymer composition together with other components. Examples of other components include residues of polymerization initiator, residual monomers, by-products obtained during polymerization, moisture, and the like. The composition may contain one or two or more thereof.

The amino group-containing polymer composition preferably contains 1% to 100% by mass of the amino group-containing polymer of the present invention for 100% by mass of the amino group-containing polymer composition. One of preferable embodiments of the amino group-containing polymer composition is one containing 40% to 60% by mass of the amino group-containing polymer of the present invention and 40% to 60% by mass of water.

[Method of Producing the Amino Group-Containing Polymer of the Present Invention]

The amino group-containing polymer of the present invention can be produced by, for example, copolymerizing monomers (A) and (B) as essential components and optionally other monomer components including the other monomer (E) at a specific ratio.

In the method for producing the amino group-containing polymer, the proportions of the monomers to be used in polymerization are as follows. The proportion of the monomer (A) in 100% by mass of the total of all the monomers (the monomers (A), (B), and (E)) is 1% to 99% by mass, and the proportion of the monomer (B) is 1% to 99% by mass in total. If the amount of the monomer (A) is less than 1% by mass, the dispersibility of contaminant components and the anti-soil redeposition property are deteriorated, which may lead to deterioration in detergency. Also, less than 1% by mass of the monomer (B) may cause loss of control of the molecular weight of the polymer and the polymerizability of the monomer (A). The present invention also includes such a method for producing the amino group-containing polymer that includes the step of polymerizing the monomer (A) and the monomer (B) and uses the monomer (A) in an amount of 1% to 99% by mass and the monomer (B) in an amount of 1% to 99% by mass, for 100% by mass of the total of all the monomers to be used.

With regard to the proportions of the monomers to be used in the polymerization, preferably the proportion of the monomer (A) is 5% to 90% by mass, and that of the monomer (B) is 10 to 95% by mass. More preferably, the proportion of the monomer (A) is 10% to 80% by mass, and that of the monomer (B) is 20% to 90% by mass. Particularly preferably, the proportion of the monomer (A) is 15% to 70% by mass, and that of the monomer (B) is 30% to 85% by mass.

Also, the monomers may contain 0% to 60% by mass, more preferably 0% to 50% by mass, and further preferably 0% to 10% by mass of the other monomer (E) for 100% by mass of the total of all the monomers (the monomers (A), (B), and (E)). Particularly preferably, the monomers contain 0% by mass of the other monomer (E).

The polymerization method to be used for production of the amino group-containing polymer is not particularly limited, and a usual polymerization method or a modified method thereof can be used. Examples of the polymerization method include radical polymerization methods. Specifically, oil-in-water emulsion polymerization, water-in-oil emulsion polymerization, suspension polymerization, dispersion polymerization, precipitation polymerization, solution polymerization, aqueous polymerization, block polymerization, or the like can be used. Preferable among these is solution polymerization because it is highly safe and can reduce production cost (polymerization cost).

In the solution polymerization, the monomer components are polymerized in a solvent. The solvent is not particularly limited, and one usually used in solution polymerization can be used. Examples of a suitable solvent include aqueous solvents such as water, alcohols, glycols, glycerin, and polyethylene glycols. Among these, water is more preferred.

One of these solvents may be used alone, or two or more of the solvents may be used in combination. In addition, in order to improve the solubility of the monomer components in the solvent, an organic solvent may be appropriately added to the extent that it does not exert harmful effects on polymerization reaction.

The organic solvent is not particularly limited, and any appropriate organic solvent can be used. Examples thereof include: lower alcohols such as methanol and ethanol; amides such as dimethyl formaldehyde; and ethers such as diethyl ether and dioxane. One of these organic solvents may be used alone, or two or more of the organic solvents may be used in combination.

The amount of the solvent to be used is preferably within the range of 40 to 300 parts by mass, more preferably in the range of 45 to 200 parts by mass, and further preferably 50 to 150 parts by mass, for 100 parts by mass of the total of all the monomers (the monomers (A), (B), and (E)). If the amount of the solvent to be used is less than 40 parts by mass for 100 parts by mass of the total of all the monomers, the polymer to be obtained may have too high a molecular weight. On the other hand, if the amount of the solvent to be used is more than 300 parts by mass for 100 parts by mass of the total of all the monomers, the polymer to be obtained may have a low concentration, which may result in need for solvent removal.

Here, part or all of the solvent may be charged in a reactor at the beginning of polymerization. Part of the solvent may be added (dripped) to the reaction system during polymerization reaction. Alternatively, a mixture of the solvent and other components such as the monomer components and an initiator may be previously prepared and then be added to the reaction system during reaction.

The reaction pattern in the solution polymerization is not particularly limited, and the reaction can be carried out by a usual pattern. Examples of patterns typically used include one in which a solution containing the monomer components and a solution with a polymerization initiator (hereinafter, also referred to as "initiator") are dripped to a solvent previously charged in the reaction system to perform a reaction. In such a pattern, the concentration of each of the solutions to be dripped is not particularly limited, and any appropriate concentration can be accepted.

Examples of the pattern in which a solution containing the monomer components and a solution with an initiator are dripped to a solvent previously charged in the reaction system to perform the reaction include a pattern in which the monomer (A), the monomer (B), optionally the other monomer (E), an initiator component, and other additives, if necessary, are each dissolved in a solvent and the resultant mixtures are appropriately added (dripped) to the reaction system during polymerization reaction to carry out polymerization. Here, the monomers, the initiator component, and additives may be added as they are without dissolution in a solvent. In this pattern, part or all of the total monomer (A) to be used may be added to the reaction system before polymerization starts (initial charging).

In the polymerization reaction performed by the solution polymerization, the addition of the monomer (A) to the reaction system is preferably completed before the addition of the monomer (B). Preferably, at the end of the addition of the monomer (A), 5% to 100% by mass of the total of the monomer (B) to be used is still not added. More preferably, 10% to 50% by mass of the total of the monomer (B) to be used is still not added, and particularly preferably 15% to 35% by mass is still not added. If polymerization is carried out by such an addition method, the polymerizability of the amino group-containing monomer (A) can be improved. This enables to enhance such as dispersibility and anti-soil redeposition property of the polymer to be obtained.

<Polymerization Initiator>

The polymerization initiator to be used in the production method may be one usually used. Specific examples of the polymerization initiator suitably used include: hydrogen peroxide; persulfates such as sodium persulfate, potassium persulfate, and ammonium persulfate; azo compounds such as 2,2'-azobis(2-amidinopropane)hydrochloride, 4,4'-azobis-4-cyanovaleric acid, azobisisobutyronitrile, and 2,2'-azobis(4-methoxy-2,4-dimethyl valeronitrile); and organic peroxides such as benzoyl peroxide, lauroyl peroxide, acetic peracid, di-t-butyl peroxide, and cumene hydroperoxide. Preferred among these are hydrogen peroxide, persulfates, and 2,2'-azobis (2-amidinopropane)hydrochloride, and persulfates and 2,2'-azobis (2-amidinopropane)hydrochloride are most preferred. Each of these polymerization initiators can be used alone, or two or more thereof can be used in combination.

<Chain Transfer Agent>

In the production method, a chain transfer agent may be optionally used as a molecular weight modifier as long as it does not exert harmful effects on polymerization. A chain transfer agent prevents the resulting polymer from having an excessively high molecular weight and advantageously enables efficient production of the amino group-containing polymer with a low molecular weight.

Specific examples of the chain transfer agent include: thiol chain transfer agents such as mercaptoethanol, thioglycerol, thioglicolic acid, 2-mercaptopropionate, 3-mercaptopropionate, thiomalic acid, octyl thioglycolate, octyl 3-mercapto-propionate, 2-mercaptoethane sulfonate, n-dodecylmercaptan, octyl mercaptan, and butyl thioglycolate; halides such as carbon tetrachloride, methylene chloride, bromoform, and bromotrichloroethane; secondary alcohols such as isopropanol and glycerin; and lower oxides and salts thereof such as phosphorous acid, hypophosphoric acid, and salts thereof (e.g. sodium hypophosphite, potassiumu hypophosphite) and sulfurous acid, bisulfite, dithionous acid, metabisulfite, and salts thereof (e.g. sodium hydrogensulfite, potassium hydrogensulfite, sodium dithionite, potassium dithionite, sodium metabisulfite, potassium metabisulfite), and the like. Each of these chain transfer agents may be used alone, or two or more thereof may be used in combination.

In the production method, sulfurous acid and/or a sulfite (hereinafter, also referred to as "sulfurous acid (salt)") is preferably used as a chain transfer agent. In this case, a polymerization initiator is used in addition to the sulfurous acid (salt). Further, a heavy metal ion may be used in combination as a reaction accelerator, which will be described below.

The sulfurous acid (salt) herein means sulfurous acid, hydrogen sulfite, or a salt thereof. Especially, it is suitable that sulfurous acid and/or hydrogen sulfite be a salt. Here, compounds that produce hydrogen sulfites (bisulfites) (e.g. disulfites) by hydrolysis such as disulfite are also included in the sulfurous acid (salt).

The salt is preferably, for example, a metal salt, an ammonium salt, or an organic amine salt.

Examples of preferred metal salts include salts of alkali metals such as a lithium salt, a sodium salt, and a potassium salt; salts of alkaline earth metals such as a calcium salt and a magnesium salt; and salts of heavy metals such as an aluminum salt and an iron salt, and the like.

Examples of preferred organic ammonium salts (organic amine salts) include salts of alkanol amines such as an ethanolamine salt, a diethanolamine salt, and a triethanolamine salt, and a triethylamine salt, and the like.

Thus, examples of the sulfurous acid (salt) preferably used in the present invention include sodium hydrogensulfite, potassium hydrogensulfite, ammonium hydrogensulfite, sodium sulfite, potassium sulfite, and ammonium sulfite, and the like. Sodium hydrogensulfite is particularly preferred. Each of the sulfurous acids (salts) may be used alone, or two or more thereof may be used in combination.

<Reaction Accelerator>

In the production method, a reaction accelerator may be added in order to reduce the amount of an initiator to be used, for example. The reaction accelerator may be, for example, a heavy metal ion. The heavy metal ion in the present invention means a metal having a specific gravity of 4 $g/cm^3$ or larger.

Examples of a preferred heavy metal of the heavy metal ion include iron, cobalt, manganese, chromium, molybdenum, tungsten, copper, silver, gold, lead, platinum, iridium, osmium, palladium, rhodium, and ruthenium. One or two or more of these heavy metals can be used. More preferred among these is iron.

The ionic valency of the heavy metal ion is not particularly limited. In the case that iron is used as the heavy metal, an iron ion in the initiator may be $Fe^{2+}$ or $Fe^{3+}$, or both of them may be contained.

The heavy metal ion is not particularly limited as long as it is contained in the form of an ion. Preferably, a solution containing a heavy metal compound dissolved therein is used because such a solution is excellent in handleability. The heavy metal compound used in this case may be one containing a heavy metal ion that is desired to be contained in an initiator, and may be selected depending on the initiator to be used.

In the case that iron is used as a heavy metal ion, heavy metal compounds such as Mohr's salt (Fe $(NH_4)_2(SO_4)_2 \cdot 6H_2O$), iron(II) sulfate heptahydrate, iron(II) chloride, and iron(III) chloride are preferably used, for example. In the case that manganese is used as a heavy metal ion, manganese chloride is suitably used, for example. These are all water-soluble compounds, and thereby can be used in the form of an aqueous solution. Thus, these are excellent in handleability.

Here, the solvent of solution prepared by dissolving the heavy metal compound therein is not limited to water, and may be one that does not prevent polymerization reaction and can dissolve a heavy metal compound in producing the amino group-containing polymer of the present invention.

The method for adding the heavy metal ion is not particularly limited. Preferably, it is added by the end of the addition of the monomers. Particularly preferably, the entire amount of the heavy metal ion is initially charged into the reaction system. Also, the amount of the heavy metal ion to be used is preferably 100 ppm or less, more preferably 70 ppm or less, further preferably 50 ppm or less, and particularly preferably 30 ppm or less for the total of the reaction solution. If the amount is more than 100 ppm, the effects of adding the heavy metal ion may not be obtained. Also, the polymer to be obtained is highly colored. Such a polymer may be disadvantageously unable to be used as a detergent composition.

The heavy metal ion-content is preferably 0.1 to 10 ppm for the total mass of the polymerization reaction solution at the end of the polymerization reaction. If the heavy metal ion-content is less than 0.1 ppm, the effects of the heavy metal ion may not be exhibited sufficiently. If the heavy metal ion-content is more than 10 ppm, the polymer to be obtained may have deteriorated color tone. On the other hand, if the heavy metal ion-content is large, the resulting polymer may cause stain when used as a detergent builder.

Here, "at the end of the polymerization reaction" means the point when the polymerization reaction in the polymerization reaction solution is substantially completed and the desired polymer is obtained. For example, if the polymer polymerized in the polymerization reaction solution is neutralized by an acid, the heavy metal ion-content is calculated on the basis of the total mass of the polymerization reaction solution after neutralized. Also, if two or more heavy metal ions are contained, the total of the heavy metal ions is within the range.

In the production method, a decomposed catalyst of polymerization initiator and a reductive compound can be added to the reaction system upon polymerization, in addition to the above-mentioned compounds.

Examples of the decomposed catalyst of a polymerization initiator include: metal halides such as lithium chloride and lithium bromide; metal oxides such as titanium oxide and silicon dioxide; metal salts of inorganic acids such as hydrochloric acid, hydrobromic acid, perchloric acid, sulfuric acid, and nitric acid; carboxylic acids such as formic acid, acetic acid, propionic acid, butyric acid, isobutyric acid, and benzoic acid, esters thereof, and metal salts thereof; and heterocyclic amines such as pyridine, indole, imidazole, and carbazole, and derivatives thereof, and the like. Each of these decomposed catalysts may be used alone, or two or more thereof may be used in combination.

Examples of the reductive compound include: organometallic compounds such as ferrocene; inorganic compounds that can produce metal ions of iron, copper, nickel, cobalt, manganese, and the like, such as iron naphthenate, copper naphthenate, nickel naphthenate, cobalt naphthenate, and manganese naphthenate; inorganic compounds such as boron trifluoride ether adducts, potassium permanganate, and perchloric acid; sulfur containing compounds such as sulfur dioxide, sulfurous acid salts, sulfuric acid esters, bisulfites, thiosulfates, sulphoxylates, benzensulfinic acid and substitution products thereof, and homologues of cyclic sulfinic acids such as paratoluenesulfinic acid; mercapto compounds such as octyl mercaptan, dodecyl mercaptan, mercaptoethanol, α-mercapto propionic acid, thioglycolic acid, thiopropionic acid, sodium α-thiopropionate sulfopropyl ester, and sodium α-thiopropionate sulfoethyl ester; nitrogen-containing compounds such as hydrazine, β-hydroxyethyl hydrazine, and hydroxylamine; aldehydes such as formaldehyde, acetaldehyde, propionaldehyde, n-butyl aldehyde, isobutyl aldehyde, and isovaleric aldehyde; and ascorbic acid, and the like. Each of these reductive compounds may be used alone, or two or more of these may be used in combination. Reductive compounds such as mercapto compounds may be added as a chain transfer agent.

Combination of the chain transfer agent, the initiator, and the reaction accelerator is not particularly limited. The agents are each appropriately selected from the above examples. Preferred combinations of the chain transfer agent, the initiator, and the reaction accelerator are, for example, sodium hydrogensulfite/hydrogen peroxide, sodium hydrogensulfite/sodium persulfate, sodium hydrogensulfite/Fe (ion), sodium hydrogensulfite/hydrogen peroxide/Fe (ion), sodium hydrogensulfite/sodium persulfate/Fe (ion), sodium hydrogensulfite/sodium persulfate/hydrogen peroxide, and sodium hydrogensulfite/oxygen/Fe (ion). More preferred combinations are sodium persulfate/hydrogen peroxide, sodium persulfate/hydrogen peroxide/Fe (ion), sodium hydrogensulfite/sodium persulfate, and sodium hydrogensulfite/sodium persulfate/Fe (ion), and particularly preferred are sodium hydrogensulfite/sodium persulfate/Fe (ion) and sodium persulfate/hydrogen peroxide/Fe (ion).

<Amounts of Reaction Initiator and Agents to be Used>

The amount of the reaction initiator is not particularly limited as long as it is enough to initiate copolymerization of the monomers. Preferably, the amount is 15 g or less for 1 mol of all the monomer components (the monomers (A), (B), and (E)), and is more preferably 1 to 12 g.

In the case that hydrogen peroxide is used as the initiator, the amount of hydrogen peroxide is preferably 1.0 to 10.0 g, and is more preferably 2.0 to 8.0 g, for 1 mol of the total of all the monomers. If the amount of hydrogen peroxide is less than 1.0 g, the polymer to be obtained tends to have a high weight average molecular weight. On the other hand, if the amount is more than 10.0 g, the effects to be obtained are disproportionate to an increase in the amount. Also, such an amount of hydrogen peroxide has adverse effects such as an increase in the amount of residual hydrogen peroxide.

In the case that a persulfate is used as the initiator, the amount of the persulfate is preferably 1.0 to 5.0 g, and more preferably 2.0 to 4.0 g, for 1 mol of the total of all the monomer components. If the amount of the persulfate is less than the above range, the polymer to be obtained tends to a have high molecular weight. On the other hand, if the amount is more than the above range, the effects to be obtained are disproportionate to an increase in the amount. Also, such an amount of the persulfate has the effects such as reduction in purity of the polymer to be obtained.

In the case that hydrogen peroxide and a persulfate are used in combination as the initiator, the ratio of hydrogen peroxide and persulfate in weight of the persulfate to the hydrogen peroxide is preferably in the range from 0.1 to 5.0 and is more preferably in the range from 0.2 to 2.0. If the ratio in weight of the persulfate is smaller than 0.1, the polymer to be obtained tends to have a high molecular weight. If the ratio in weight of the persulfate is larger than 5.0, the effect of reducing the molecular weight as a result of adding the persulfate is disproportionate to an increase in the amount, which leads to the waste of the persulfate in the polymerization reaction system.

With regard to the method for adding the hydrogen peroxide, the additive amount of the hydrogen peroxide to be substantially continuously dripped is preferably 85% by mass or more of the predetermined amount of the hydrogen peroxide required in the polymerization. More preferably, the amount is 90% by mass or more, and most preferably 100% by mass. In other words, it is most preferable to drip the whole the hydrogen peroxide. When dripping hydrogen peroxide continuously, the addition rate may be altered.

If the reaction is performed under the suitable conditions (e.g. temperature, pressure, pH) described below, the dripping of the hydrogen peroxide is preferably started after the start of the dripping of the monomers (excluding monomers initially charged). Specifically, the dripping of hydrogen peroxide is preferably started 1 minute or later, more preferably 3 minutes or later, further preferably 5 minutes or later, and most preferably 10 minutes or later than the start of the dripping of the monomer (A). Delayed start of the dripping of hydrogen peroxide can lead to smooth start of the polymerization in the beginning and narrow molecular weight distribution. The dripping of the hydrogen peroxide is preferably started within 60 minutes from the start of dripping the monomer, and more preferably within 30 minutes.

The dripping of the hydrogen peroxide may be started at the same time as the dripping of the monomers. Also, hydrogen peroxide may be charged prior to the dripping of the monomers. In the case of previously charging hydrogen peroxide, the amount of hydrogen peroxide charged prior to the dripping is preferably 10% or less, more preferably 7% or less, further preferably 5% or less, and particularly preferably 3% or less of the predetermined amount of the hydrogen peroxide required in the polymerization.

If hydrogen peroxide in an amount more than 10% of the predetermined amount thereof required in the polymerization is added before the start of dripping the monomers, the ratio in concentration of the hydrogen peroxide to a persulfate to be used in combination is large. This may result in stop of the polymerization. On the other hand, if the dripping of hydrogen peroxide is started more than 60 minutes after the start of the dripping of the monomers, chain transfer reaction and the like by the hydrogen peroxide do not occur, and thereby the molecular weight at the beginning of the polymerization is high.

If the reaction is performed under the suitable conditions (e.g. temperature, pressure, pH) described below, the dripping of hydrogen peroxide is preferably completed at the same time as the dripping of the monomers. The dripping of hydrogen peroxide is more preferably completed 10 minutes or earlier, and particularly preferably 30 minutes or earlier than the completion of dripping of the monomers. Here, if the dripping is completed after the completion of the dripping of the monomers, the reaction system is not particularly adversely affected. In this case, however, the hydrogen peroxide added is not completely decomposed by the end of the polymerization. This results in waste of the hydrogen peroxide because such an unreacted hydrogen peroxide provides no effect. Also, if a large amount of hydrogen peroxide remains, the heat stability of the polymer to be obtained may be adversely affected disadvantageously.

The method of adding the persulfate is not particularly limited. Considering the degradability and the like, the amount of the persulfate to be substantially continuously dripped is preferably 50% by mass or more, more preferably 80% by mass or more, and most preferably 100% by mass, that is, the entire amount, of the predetermined amount of the persulfate required in the polymerization. In the continuous dripping of the persulfate, the addition rate may be altered. The addition time is also not particularly limited. If the reaction is performed under the suitable conditions (e.g. temperature, pressure, pH) described below, the dripping of the persulfate is preferably continued until the end of the dripping of the monomers because persulfates are relatively quickly decomposed initiators. Also, the dripping is more preferably completed within 30 minutes, and particularly preferably within 5 to 20 minutes after the completion of the dripping of the monomers. Thereby, the amount of the monomers that remain in the polymer to be obtained can be significantly reduced.

Here, even though the dripping of these initiators is completed before the completion of the dripping of the monomers, polymerization is not particularly adversely affected. The end time of dripping the initiator may be set depending on the amount of the monomers remaining in the polymer to be obtained.

With regard to the initiator that is relatively quickly decomposed such as a persulfate, only the preferable range for the end time of the dripping is described above. However, the starting time of the dripping is not limited, and may be appropriately set. For example, the dripping of the initiator may be started before the start of the dripping of the monomers. If two or more initiators are used in combination, the dripping of one of the initiators may be started first. The dripping of the other or another one of the initiators may be started after a certain period or started after the dripping of the first initiator is completed. In each case, the starting time of the dripping may be appropriately set depending on the decomposition rate of the initiator and reactivity of the monomers.

In the case that the polymerization initiator is added by dripping, the concentration of the initiator in solution is not particularly limited, and is preferably 5% to 60% by mass, and particularly preferably 10% to 50% by mass. A concentration of the initiator of less than 5% by mass may result in a significantly low monomer concentration during polymerization, which leads to significantly deteriorated polymerizability of the monomers and significantly large amounts of the monomers remaining in the polymer to be obtained. Also, the transportation efficiency, productivity, and the like are deteriorated, which is economically unfavorable. Adversely, a concentration of more than 60% by mass is problematic in terms of safety and easiness of dripping.

The amount of the chain transfer agent is not particularly limited as long as the amount is sufficient for favorable polymerization of the monomers (A), (B), and (E). The amount is preferably 1 to 20 g, and more preferably 2 to 15 g, for 1 mol of the total of all the monomer components including the monomers (A), (B), and (E). An amount of the chain transfer agent of less than 1 g may lead to loss of control of the molecular weight. On the other hand, an amount of more than 20 g may result in large amounts of impurities and reduction in purity of the polymer. Especially, in the case that a sulfurous acid is used, sulfite gas may be generated by decomposition of the excess sulfite in the reaction system. Also, such an amount of sulfite may be economically disadvantageous.

With regard to the combination of a polymerization initiator and a chain transfer agent, it is most preferable to use one or more persulfates and one or more sulfites. In this case, the ratio between the persulfate and the sulfite is not particularly limited. Preferably, 0.5 to 5 parts by mass of the sulfite is used for 1 part by mass of the persulfate. The lower limit of the amount of the sulfite is more preferably 1 part by mass for 1 part by mass of the persulfate, and most preferably 2 parts by mass. The upper limit of the amount of the sulfite is preferably 4 parts by mass, and most preferably 3 parts by mass for 1 part by mass of the persulfate. If the amount of the sulfite is less than 0.5 parts by mass for 1 part by mass of the persulfate, a larger amount of an initiator may be needed in reducing the molecular weight. If the amount is more than 5 parts by mass, side reaction may occur more often, which may result in larger amount of impurities.

The total amount of the chain transfer agent, initiator, and reaction accelerator is preferably 2 to 20 g for 1 mol of the total of all the monomer components including the monomers (A), (B), and (E). If the total amount is in the range, the polymer of the present invention can be produced efficiently. Also, a desired molecular weight distribution of the amino group-containing polymer can be obtained. The range is more preferably 4 to 18 g, and further preferably 6 to 15 g.

In the production methods, the monomer components, a polymerization initiator, and a chain transfer agent may be added to a reactor by continuous addition methods such as dripping and separate charging. Also, each of the monomer components, a polymerization initiator, and a chain transfer agent may be introduced in a reactor separately or may be mixed with another component, a solvent, and the like prior to the addition.

Specific examples of the adding method include: a method in which all of the monomer components are charged in a reactor, followed by adding a polymerization initiator to the reactor to carry out copolymerization; a method in which some of the monomer components are charged in a reactor, and then a polymerization initiator and the rest of the monomer components are charged into the reactor continuously or stepwise (preferably continuously) to carry out copolymerization; and a method in which a polymerization solvent is charged in a reactor, and then all of the monomer components and a polymerization initiator are added to the reactor, and the like. Preferable among these methods is a method in which a polymerization initiator and the monomer components are successively dripped to carry out copolymerization because this method enables to provide a polymer with a narrow (sharp) molecular weight distribution and to improve the dispersibility of contaminants and anti-soil redeposition property. Such a polymerization may be performed by a batch type method or continuous type method.

<Polymerization Conditions>

In the production methods, polymerization conditions such as a polymerization temperature may be appropriately determined depending on the polymerization method, the solvent, the polymerization initiator, and the like to be used. The polymerization temperature is preferably 25° C. to 200° C., more preferably 50° C. to 150° C., further preferably 60° C. to 120° C., and especially preferably 80° C. to 110° C. If the polymerization temperature is too low, the polymer to be obtained may have too high a weight average molecular weight. Also, increased amounts of impurities may be produced.

The polymerization temperature is not necessarily substantially constant during the polymerization reaction. For example, the polymerization temperature may be room temperature at the beginning of the polymerization and raised to a set temperature over an appropriate heating period or at an appropriate heating rate and then may be maintained. Alternatively, the temperature may be altered (raised or dropped) with time during polymerization reaction depending on the method for dripping the monomer component and an initiator, and the like. Here, the "polymerization temperature" herein means the temperature of the reaction solution during polymerization reaction. The polymerization temperature may be measured or controlled by any appropriate method or means. For example, a device generally used may be used.

The state of pressure during the polymerization in the production methods is not particularly limited, and the polymerization can be performed under any appropriate state of pressure. For example, the polymerization may be performed under any of ordinary (atmospheric) pressure, reduced pressure, and increased pressure. The atmosphere in the reaction system may be the air atmosphere or an inert gas atmosphere. If the atmosphere in the reaction system is an inert gas atmosphere, for example, the inert gas atmosphere can be prepared by replacing the air in the reaction system by an inert gas such as nitrogen prior to the start of the polymerization. Thereby, the atmosphere gas (e.g. oxygen gas) in the reaction system is dissolved in the liquid phase and it act as a polymerization inhibitor.

In the production methods, the solids concentration in the reaction solution (polymerization mixture) at the end of addition of addition ingredient and the polymerization reaction in the reaction system is preferably 35% by mass or higher. If the solids concentration is lower than 35% by mass, the productivity of the polymer to be obtained may not be improved significantly. The solids concentration is more preferably 40% to 70% by mass, and further preferably 45% to 65% by mass. If the solids concentration at the end of the polymerization reaction is 35% by mass or higher, polymerization can be performed at high concentration through one stage, which enables efficient production of the polymer. For example, such a solids concentration enables omission of a concentration step, great improvement of productivity of the polymer, and suppression of an increase in the production cost. Here, "the end of the polymerization reaction" means a point at which the addition of all of the components to be added is completed. Preferably, the solids concentration of the reaction mixture is within the range even at a point at which a predetermined period of aging (a point at which the polymerization is completed). The solids concentration can be calculated by determining the amount of the non-volatile component after drying the resultant mixture with an air forced oven at 130° C. for one hour.

The aging time is preferably 1 to 120 minutes, more preferably 5 to 60 minutes, and further preferably 10 to 30 minutes. If the aging time is shorter than 1 minute, aging is insufficient and the monomer components may remain and thus impurities caused by such remaining monomers may lead to reduction in performance, and the like. If the aging time is longer than 120 minutes, the polymer solution may be colored.

In the production methods, the polymerization time is not particularly limited, and is preferably 30 to 420 minutes, more preferably 45 to 390 minutes, further preferably 60 to 360 minutes, and most preferably 90 to 300 minutes. Here, the "polymerization time" in the present invention means a time of adding the monomers, that is, a time between the start and the end of the addition of the monomers, unless otherwise mentioned.

The amino group-containing polymer of the present invention that can be produced by the production methods is capable of exhibiting high performance in aqueous applications and have hard water resistance, high detergency, high anti-soil redeposition property, high clay dispersibility, and high interaction with surfactants, and the like. Thus, the amino group-containing polymer can exhibit excellent performance especially when it is used in dispersants, detergent builders, detergent compositions, cleaning agents, water treatment agents, and fiber treatment agents.

[Applications]

The amino group-containing polymer (or the amino group-containing polymer composition) of the present invention can be used as coagulants, flocculants, printing inks, adhesives, soil conditioners (soil reforming agents), flame retardants, skin care medicines, hair cares, additives for shampoo, hair lacquers, soaps, and cosmetics, anion exchange resins, dye mordants and aids for fibers and photo films, agents used in the manufacture of paper including spreading agents for pigment, paper strengthening agents, emulsifiers, antiseptic agents, softening agents for paper and fabrics, and additives for lubricants, water treatment agents, fiber treatment agents, dispersants, detergent additives, scale inhibitors (scale suppressors), metal ion sealing compounds, thickeners, various binders, and emulsifiers, for example. Among these, as described above, the polymer is preferably used in water treatment agents, fiber treatment agents, dispersants, detergent builders, and detergent compositions. Namely, water treatment agents, fiber treatment agents, dispersants, detergent builders, and detergent compositions which contain the amino group-containing polymer are also preferable embodiments of the present invention.

In the following, the applications of the amino group-containing polymer are further described.

<Water Treatment Agent>

The amino group-containing polymer (or amino group-containing polymer composition) of the present invention can be used in water treatment agents.

The water treatment agents may optionally contain a polyphosphate, a phosphonate, an anticorrosive, a slime control agent, and a chelating agent, as other components.

The water treatment agents are useful for scale inhibition in cooling water circulation systems, boiler water circulation systems, seawater desalination systems, pulp digesters, and black liquor concentrators, and the like. The water treatment agents may also contain any appropriate aqueous polymer as long as it does not impair the performance and the effects.

<Fiber Treatment Agent>

The amino group-containing polymer (or amino group-containing polymer composition) of the present invention can also be used in fiber treatment agents.

The amount of the amino group-containing polymer of the present invention in the fiber treatment agent is preferably 1% to 100% by mass, and more preferably 5% to 100% by mass for 100% by mass of the total of the fiber treatment agent. The fiber treatment agent may also contain any appropriate aqueous polymer as long as it does not impair the performance and effects.

The fiber treatment agent can be used in the steps of refining, dyeing, breaching, and soaping, in fiber treatment.

The fiber treatment agent preferably contains at least one selected from the group consisting of dyes, peroxides, and surfactants and the amino group-containing polymer (or amino group-containing polymer composition) of the present invention. The dyes, peroxides, and surfactants may be ones usually used in fiber treatment agents.

With respect to the ratio of the amino-group containing polymer and the at least one selected from the group consisting of dyes, peroxides, and surfactants, the at least one selected from the group consisting of dyes, peroxides, and surfactants is preferably 0.1 to 100 parts by weight for 1 part by weight of the polymer of the present invention in terms of fineness of the fiber treatment agent, in order to, for example, improve brightness, color heterogeneity, and color fastness of fibers.

The fiber treating agent can be used for any appropriate fibers. Examples thereof include cellulose fibers such as cotton and linen, chemical fibers such as nylon and polyester, animal fibers such as wool and silk, semisynthetic fibers such as art silk, textiles thereof, and blends thereof.

If the fiber treatment agent is used in the refining step, the polymer of the present invention, an alkali agent, and a surfactant are preferably added thereto. If the fiber treatment agent is used in a breaching step, the polymer of the present invention, a peroxide, and a siliceous agent (e.g. sodium silicate) as a degradation suppressor for alkali breaching agent are preferably added thereto.

<Dispersant>

The amino group-containing polymer (or amino group-containing polymer composition) of the present invention may also be used in dispersants. Among dispersants, the polymer is suitably used in inorganic pigment dispersants.

The inorganic pigment dispersant may optionally contain a condensed phosphoric acid and a salt thereof, a phosphoric acid and a salt thereof, and polyvinyl alcohol, as other additives.

The amount of the amino group-containing polymer of the present invention in the inorganic pigment dispersant is preferably 5% to 100% by mass for 100% by mass of the total of the inorganic pigment dispersant. Also, the dispersant may contain any appropriate water-soluble polymer as long as it does not impair the performance and effects.

The inorganic pigment dispersant can exhibit favorable performance as a dispersant for inorganic pigments such as heavy or light calcium carbonate or clay that are used in paper coating. For example, a concentrated inorganic pigment slurry (e.g. concentrated calcium carbonate slurry) having low viscosity and high fluidity and excellent in daily stability of these properties can be produced by dispersing a mixture of a small amount of the inorganic pigment dispersant and an inorganic pigment in water.

If the inorganic pigment dispersant is used as a dispersant for inorganic pigments, the amount of the inorganic pigment dispersant to be used is preferably 0.05 to 2.0 parts by weight for 100 parts by weight of the inorganic pigment. If the amount of the inorganic pigment dispersant is within the range, a sufficient dispersion effect can be obtained. Also, the effect can be proportionate to the amount of the dispersant added, which may be economically advantageous.

<Detergent Builder>

The amino group-containing polymer (or the amino group-containing polymer composition) of the present invention can be used as a detergent builder. The polymer as a detergent builder can be added to various detergents such as ones for clothing, for dishes, for household, for hair, for the body, for toothbrushing, and for automobiles.

<Detergent Composition>

The amino group-containing polymer (or the amino group-containing polymer composition) of the present invention can be added to a detergent composition. That is, the amino group-containing polymer can be also used as an additive for a detergent (also referred to as a detergent additive). A detergent composition containing the amino group-containing polymer is also one aspect of the present invention.

The amount of the amino group-containing polymer in the detergent composition is not particularly limited. From the viewpoint of an excellent builder property, the amount of the amino group-containing polymer is preferably 0.1% to 15% by mass, more preferably 0.3% to 10% by mass, and further preferably 0.5% to 5% by mass, for 100% by mass of the total of the detergent composition.

The detergent composition used in detergent applications usually contains a surfactant and a detergent additive which are usually used in detergents. The specific form of the surfactant and the additive is not particularly limited, and the findings generally known in the detergent field can be appropriately referred. Also, the detergent composition may be a powder detergent composition or a liquid detergent composition.

Here, the term detergent composition includes synthetic detergents for household use, industrial detergents for fiber industry and the like, hard surface cleaners, and detergents which are used only for particular application and have one enhanced function, such as breaching agents.

The surfactant is preferably one or two or more selected from the group consisting of anionic surfactants, nonionic surfactants, cationic surfactants, and amphoteric surfactants. If two or more of surfactants are used in combination, the total amount of the anionic surfactant and the nonionic surfactant is preferably 50% by mass or more, more preferably 60% by mass or more, further preferably 70% by mass or more, and especially preferably 80% by mass or more for 100% by mass of the total of the surfactants.

Examples of suitable anionic surfactants include alkyl benzene sulfonates, alkyl ether sulfates, alkenyl ether sulfates, alkyl sulfates, alkenyl sulfates, α-olefin sulfonates, α-sulfo fatty acids and ester salts thereof, alkane sulfonates, saturated fatty acid salts, unsaturated fatty acid salts, alkyl ether carboxylates, alkenyl ether carboxylates, amino acid surfactants, N-acyl amino acid surfactants, alkyl phosphates and salts thereof, and alkenyl phosphates and salts thereof, and the like. The alkyl group and alkenyl group in the anionic surfactant may have an alkyl side chain such as a methyl group.

Examples of suitable nonionic surfactants include polyoxyalkylene alkyl ethers, polyoxyalkylene alkenyl ethers, polyoxyethylene alkyl phenyl ethers, higher fatty acid alkanol amides and alkylene oxide adducts thereof, sucrose fatty acid esters, alkyl glycoxides, fatty acid glycerol monoesters, and alkylamine oxides, and the like. The alkyl group and alkenyl group in the nonionic surfactant may have an alkyl side chain such as a methyl group.

The cationic surfactant is preferably, for example, a quaternary ammonium salt.

The amphoteric surfactant is preferably, for example, a carboxy amphoteric surfactant or a sulphobetaine amphoteric surfactant. The alkyl group and the alkenyl group in the cationic surfactant and the amphoteric surfactant may have an alkyl side chain such as a methyl group.

The proportion of the surfactant is usually 10% to 60% by mass for 100% by mass of the total of the detergent composition. If the proportion of the surfactant is too small, sufficient detergency may not be exhibited. Too large a proportion of the surfactant may be less economical. The proportion is preferably 15% to 50% by mass, further preferably 20% to 45% by mass, and especially preferably 25% to 40% by mass.

Examples of suitable additives include: anti-soil redeposition agents for prevention of soil redeposition such as alkali builders, chelate builders, and sodium carboxymethylcellulose; soil suppressants such as benzotriazole and ethylene thiourea; soil releasing agents; color staining inhibitors; softeners; alkaline materials for adjustment of pH; aroma chemicals; solubilizers; fluorescents; colorants; frothing agents; foam stabilizers; lustering agent; bactericides; breaching agents; breaching assistants; enzymes; dyes; and solvents, and the like. Also, zeolite is preferably added if the detergent composition is a powder detergent composition.

The detergent composition may contain other detergent builders in addition to the amino group-containing polymer (or the amino group-containing polymer composition) of the present invention.

The other detergent builders are not particularly limited, and examples thereof include: alkali builders such as carbonates, hydrogen carbonates, and silicates; chelate builders such as tripolyphosphates, pyrophosphates, Glauber's salt, nitrilotriacetates, ethylene diamine tetraacetates, citrates, copolymer salts of (meth)acryl acid, acrylic acid-maleic acid copolymer, fumarates, and zeolites; and carboxy derivatives of polysaccharides such as carboxy methyl cellulose, and the like.

Examples of the counter salt used in the builder include alkali metals such as sodium and potassium, ammonium, and amines.

The proportion of the total of the additives and other detergent builders is preferably 0.1% to 50% by mass for 100% by mass of the detergent composition. If the proportion of the total of the additives and other detergent builders is less than 0.1% by mass, a sufficient detergent property may not be exhibited. A proportion of the total of the additives and other detergent builders of more than 50% by mass may be less economical. The proportion is more preferably 0.2% to 40% by mass, further preferably 0.3% to 35% by mass, especially preferably 0.4% to 30% by mass, and most preferably 0.5% to 20% by mass.

If the detergent composition is a liquid detergent composition, the moisture content in the liquid detergent composition is preferably 0.1% to 75% by mass, more preferably 0.2% to 70% by mass, further preferably 0.5% to 65% by mass, even further preferably 0.7% to 60% by mass, especially preferably 1% to 55% by mass, and most preferably 1.5% to 50% by mass for 100% by mass of total of the liquid detergent composition.

If the detergent composition is a liquid detergent composition, the detergent composition preferably has a kaolin turbidity of 200 mg/L or lower, more preferably 150 mg/L or lower, further preferably 120 mg/L or lower, especially preferably 100 mg/L or lower, and most preferably 50 mg/L or lower.

Here, the kaolin turbidity may be measured by the following method, for example.

<Method for Determining Kaolin Turbidity>

A test sample (a liquid detergent) is uniformly stirred and charged into a 50-mm square cell with a thickness of 10 mm. After removal of the air bubbles, Turbidity (kaolin turbidity: mg/L) is measured using NDH2000 (product name, turbidimeter) produced by Nippon Denshoku Industries Co., Ltd.

Examples of enzymes which may be added to the detergent composition include proteases, lipases, and cellulases, and the like. Preferred among these are proteases, alkaline lipases, and alkaline cellulases, which are highly active in alkaline liquid cleaners. The amount of the enzyme is preferably 5% by mass or less for 100% by mass of the detergent composition. If the amount is more than 5% by mass, the detergency is not improved, which may leads to reduced economy.

Suitable examples of the alkali builder include silicates, carbonates, and sulfates. Suitable examples of the chelate builders include diglycol acid, oxycarboxylates, EDTA (ethylenediaminetetraacetic acid), DTPA (diethylenetriaminepentaacetic acid), STPP (sodium tripolyphosphate), and citric acid, and the like. Water-soluble polycarboxylic acid polymers other than the polymer of the present invention also can be used.

The detergent composition allows a detergent to be one that is excellent in dispersibility, less likely to undergo reduction in the properties during long storage or impurity precipitation during storage at low temperatures, and has significantly high quality and excellent stability.

Advantageous Effect of Invention

The amino group-containing polymer of the present invention can exert excellent dispersibility of contaminants and excellent anti-soil redeposition property during washing. Also, the polymer has excellent compatibility with surfactants, and thereby can be added to concentrated liquid detergents. Thus, the polymer of the present invention is suitably used as a material of detergent compositions and the like.

DESCRIPTION OF EMBODIMENTS

In the following, the present invention is described more specifically based on, but not limited to, examples. Unless otherwise noted, "part(s)" means "part(s) by weight", and "%" means "% by mass".

Quantitation and measurement of various physical properties of monomers and reaction intermediates were performed by the following methods.
<Conditions for Determination of Weight Average Molecular Weight and Number Average Molecular Weight (GPC)>
Device: L-7000 series, produced by Hitachi, Ltd.
Detector: HITACHI RI Detector L-7490
Column: SHODEX Asahipak GF-310-HQ, GF-710-HQ, and GF-1G 7B, produced by Showa Denko K.K.
Column temperature: 40° C.
Flow rate: 0.5 ml/min
Standard curve: POLYETHYLENE GLYCOL STANDARD, produced by GL science Inc.
Eluent: 0.1N sodium acetate/acetonitrile=3/1 (mass ratio)
<Method for Quantitation of Monomer>
Quantitation of monomers was performed by high-speed chromatography under the following condition, unless otherwise mentioned.
Device: 8020 series, produced by Tosoh Corporation
Column: CAPCELL PAK Cl UG120, produced by Shiseido Co., Ltd.
Temperature: 40.0° C.
Eluent: 10 mmol/L disodium hydrogen-phosphate dodecahydrate (adjusted to pH 7 by phosphoric acid)/acetonitrile=45/55 (volume ratio)
Flow rate: 1.0 ml/min
Detector: RI, UV (detection wavelength: 215 nm)
<Solid Content Measurement>
1.0 g of water was added to 1.0 g of a polymer composition containing the amino group-containing polymer of the present invention. Under nitrogen atmosphere, the mixture was allowed to stand in a 130° C. oven for one hour to dry. The solid content (%) and volatile component content (%) were calculated from the masses before and after the drying.

SYNTHESIS EXAMPLE 1

Figure 1:
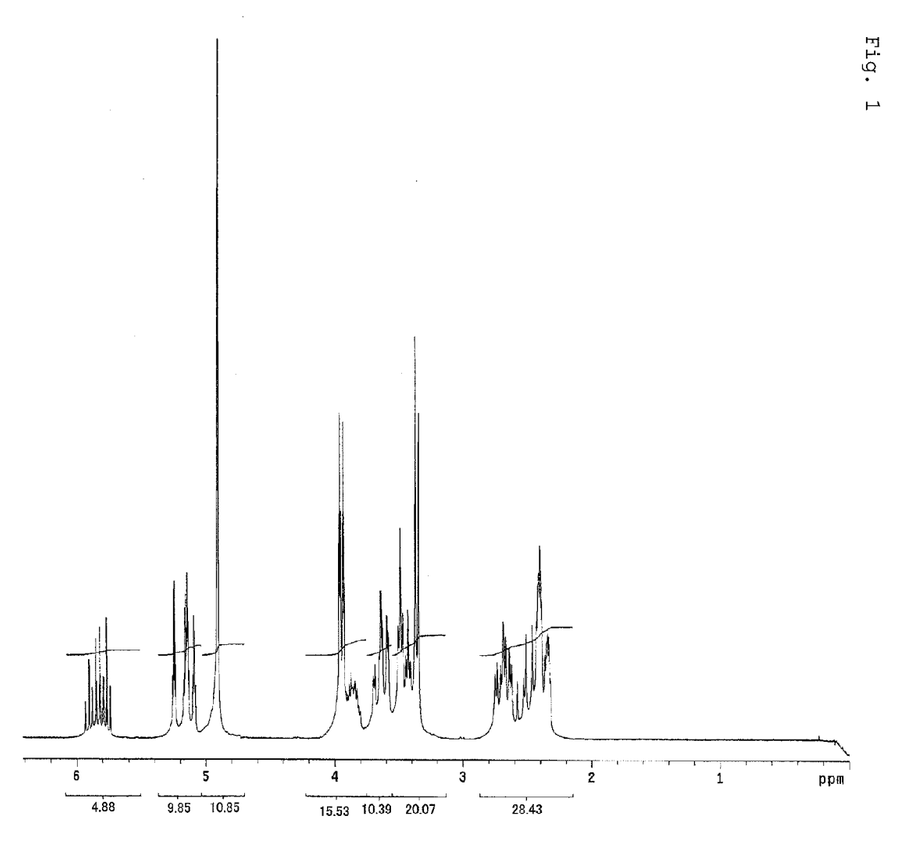
FIG. 1 is a chart of $^1$HNMR measurement of the dried monomer (1) obtained in Synthesis Example 1 (a monomer obtained by adding diethanolamine to a glycidyl group of an allylglycidyl ether).

A glass four-neck flask (1000 mL) equipped with a reflux condenser, a stirrer, and a nitrogen inlet tube was charged with 315.4 g of diethanolamine (herein after, also referred to as DEA). The temperature of the DEA was adjusted to 50° C. under nitrogen introduction and stirring. Then, 349.3 g of allylglycidyl ether (hereinafter, also referred to as AGE) was slowly dripped over two hours with stirring. The temperature of the mixture was maintained at 50° C. to 60° C. After the dripping, the mixture was aged for an additional two hours at 60° C. Then, 664.7 g of pure water was added to provide a 50% aqueous solution thereof as an aqueous solution of monomer (1).

The progress of the reaction was confirmed by liquid chromatography and $^1$HNMR.

SYNTHESIS EXAMPLE 2

Figure 2:
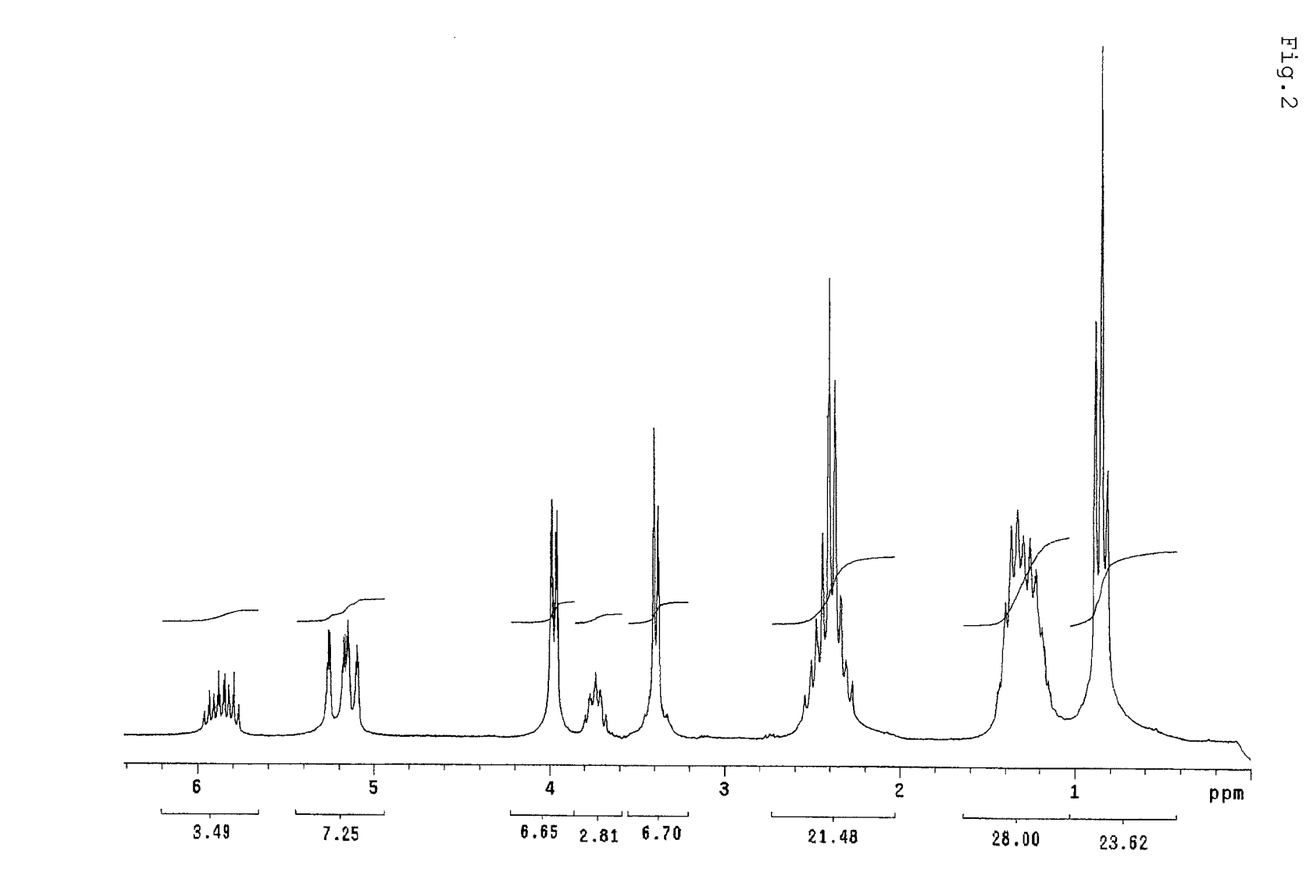
FIG. 2 is a chart of $^1$HNMR measurement of the dried monomer (2) obtained in Synthesis Example 2 (a monomer obtained by adding di-n-butylamine to a gclycidyl group of an allylglycidyl ether).

A glass four-neck flask (2000 mL) equipped with a reflux condenser, a stirrer, and a nitrogen inlet tube was charged with 491.0 g of pure water and 258.0 g of di-n-butylamine (hereinafter, also referred to as DBA) were charged in. The temperature of the mixture was adjusted to 50° C. under nitrogen introduction and stirring. Then, 232.8 g of AGE was slowly dripped over two hours with stirring. The temperature of the mixture during dripping was maintained at 50° C. to 60° C. After the dripping, the mixture was aged for an additional two hours at 60° C. The aged mixture was then cooled to room temperature and transferred to a separating funnel. The funnel was allowed to stand until the mixture was separated into two fractions, and the lower water fraction was poured off. The upper fraction was mixed with pure water and washed, and transferred to an eggplant flask. The moisture was then completely removed by a rotary evaporator. Thereby, a monomer (2) was obtained.

The progress of the reaction was confirmed by liquid chromatography and $^1$HNMR.

EXAMPLE 1

A reaction system was prepared by charging 150.0 g of pure water and 0.0046 g of Mohr's salt into a glass separable flask (1000 mL) equipped with a reflux condenser and a stirrer (paddle impellers) and heating the mixture to 90° C. while stirring. Then, under stirring, 200.0 g of hydroxyethyl acrylate (hereinafter, also referred to as HEA), 100.0 g of the aqueous solution of monomer (1), 52.1 g of a 15% aqueous sodium persulfate solution (hereinafter, also referred to as 15% NaPS), 44.6 g of 35% sodium hydrogen sulfite (hereinafter, also referred to as 35% SBS), and 108.1 g of pure water were dripped to the reaction system maintained at 90° C. through different nozzles.

The dripping of the solutions was started simultaneously. The dripping times thereof were as follows. HEA: 120 minutes; the monomer (1): 60 minutes; 15% NaPS: 130 minutes; 35% SBS: 120 minutes; and pure water: 120 minutes. Each of the solutions were continuously dripped at a constant rate. After the addition of 15% NaPS, the reaction mixture was maintained (aged) at 90° C. for an additional 30 minutes to terminate the polymerization. Thereby, an aqueous solution containing a copolymer (1) with a solids concentration of 44% (polymer composition (1)) was obtained.

EXAMPLE 2

A reaction system was prepared by charging 150.0 g of pure water and 0.0045 g of Mohr's salt into a glass separable flask (1000 mL) equipped with a reflux condenser and a stirrer (paddle impellers) and heating the mixture to 90° C. Then, under stirring, 200.0 g of dimethylaminoethyl acrylate (hereinafter, also referred to as DAA), 50.0 g of the monomer (2), 43.4 g of a 15% NaPS, and 115.1 g of pure water were dripped to the reaction system maintained at 90° C. through different nozzles.

The dripping of the solutions and water was started simultaneously. The addition times thereof were as follows. DAA: 120 minutes; the monomer (1): 60 minutes; 15% NaPS: 130 minutes; and pure water: 120 minutes. Each of the solutions and water was continuously dripped at a constant rate. After the addition of 15% NaPS, the reaction mixture was maintained (aged) at 90° C. for an additional 30 minutes to terminate the polymerization. Thereby, an aqueous solution containing a copolymer (2) with a solids concentration of 44% (polymer composition (2)) was obtained.

COMPARATIVE EXAMPLE 1

A glass separable flask (100 ml) equipped with a reflux condenser, a thermometer, and a stirrer was charged with 40 g of polyethyleneimine (Mw 9500, Mn 6500; hereinafter, also referred to as PEI). 10 g of DENACOL EX-121 (2-ethylhexylglycidyl ether (herein after, also referred to as 2EHGH), produced by Nagase ChemteX Corp.)) was added to the flask under stirring. The polymer mixture was heated to 60° C. under stirring to be reacted for four hours. Thereby, a comparison polymer (1) was obtained. The production of the comparison polymer (1) was confirmed by the following respects: The polymer in question was completely dissolved in water at any rate; and a signal derived from a methine proton produced by ring-opening of an epoxy ring was detected near 3.5 ppm in NMR spectroscopy in $D_2O$.

—Determination of Amount of Residual Monomers—

Measured result by liquid chromatography on the polymer compositions (1) and (2) showed that the amount of the monomers residual was less than 1000 ppm, which confirmed that each of these polymers had a composition corresponding to the amounts of the materials used.

—Compatibility Test—

The copolymer (1) obtained in Example 1, the copolymer (2) obtained in Example 2, and the comparison copolymer (1) obtained in Comparative Example 1 were each evaluated for the compatibility with a surfactant by the following method.

<Compatibility with Surfactant>

A detergent composition containing a test sample (polymer composition) was prepared by mixing materials in amounts described below.

SFT-70H (polyoxyethylene alkyl ether, produced by Nippon Syokubai Co., Ltd.): 40 g NEOPELEX F-65 (sodium dodecylbenzene sulfonate, produced by Kao Corp.): 7.7 g (active ingredient 5 g)

QUARTAMIN 86W (stearyltrimethylammonium chloride, produced by Kao Corp.): 17.9 g (active ingredient 5 g)

Diethanolamine: 5 g

Ethanol: 5 g

Propylene glycol: 5 g

Test sample: 1.5 g (in solid content)

Ion exchange water: balance (The amount of ion exchanged water was appropriately adjusted so that the total amount of the materials was 100 g, provided that the amount of the test sample is the amount the test sample actually used.)

The detergent composition was sufficiently stirred so that the components were mixed uniformly. Then, the turbidity at 25° C. of the detergent composition was measured with a turbidimeter ("NDH2000" produced by Nippon Denshoku Kogyo Co., Ltd.) using Turbidity (kaolin turbidity: mg/l). The compatibility was evaluated based on the kaolin turbidity as follows.

++: Kaolin turbidity was not lower than 0 but lower than 50 (mg/l). No separation, precipitation, or cloudiness was visually observed.

+: Kaolin turbidity was not lower than 50 but lower than 200 (mg/l). Slight cloudiness was visually observed.

−: Kaolin turbidity was not lower than 200 (mg/l). Cloudiness was visually observed.

—Anti-Soil Redeposition Property Test—

The copolymer (1) obtained in Example 1, the copolymer (2) obtained in Example 2, and the comparison copolymer (1) obtained in Comparative Example 1 were each evaluated for the anti-soil redeposition property by the following method. Table 1 shows the results.

<Anti-Soil Redeposition Property Test>

The anti-soil redeposition property test was carried out according to the following procedure.

(1) A polyester textile (obtained from Test fabric Inc.) was cut into pieces with a size of 5 cm×5 cm to prepare white cloths. The brightness of each white cloth was previously measured with a color difference meter (SE 2000, produced by Nippon Denshoku Ltd.) based on the reflectance.

(2) Pure water was added to 1.1 g of calcium chloride dehydrate to give a total amount of 15 kg, and thereby hard water was prepared.

(3) Pure water was added to 4.0 g of polyoxyethylene (20) lauryl ether to give 100 g, and thereby an aqueous surfactant solution was prepared. The pH was adjusted to 8.5 using sodium hydroxide.

(4) A Terg-O-tometer was set at 25° C. A pot was charged with 1 L of hard water, 5 g of the aqueous surfactant solution, 1 g of a 5% (in solid content) aqueous polymer solution, and 1.0 g of carbon black. The mixture was stirred at 150 rpm for 1 minute. Thereafter, five white cloths were placed in the pot and stirred at 100 rpm for 10 minutes.

(5) The water was removed from the white cloths by hand and the white cloths were placed in the pot containing 1 L of tap water (25° C.). Then, stirring was performed at 100 rpm for two minutes.

(6) The white cloths were covered with an ironing cloth and smoothed with an iron to dry. Thereafter, the brightness of each cloth was again measured with the color difference meter based on the reflectance.

(7) The anti-soil redeposition property was determined from the measured results obtained above using the following equation.

Anti-soil redeposition rate (%)=(Brightness after washing)/(Brightness of original white cloth)×100

TABLE 1

In Table 1, "AGE-DEA" means the aqueous solution of the monomer (1) obtained in Synthesis Example 1.

|  | Ratio (wt %) | Weight average molecular weight (Mw) | Compatibility | Anti-soil redeposition property |
|---|---|---|---|---|
| Copolymer (1) | AGE-DEA/ HEA = 20/80 | 8700 | ++ | 79% |

TABLE 1-continued

In Table 1, "AGE-DEA" means the aqueous solution of the monomer (1) obtained in Synthesis Example 1.

|  | Ratio (wt %) | Weight average molecular weight (Mw) | Compatibility | Anti-soil redeposition property |
|---|---|---|---|---|
| Copolymer (2) | AGE-DBA/ DAA = 20/80 | 30000 | ++ | 76% |
| Comparison copolymer (1) | PEI/2EHGE = 80/20 | 10000 | − | 65% |

"AGE-DBA" means the monomer (2) obtained in Synthesis Example 2.

The results of the examples and comparative example show that the amino group-containing polymer of the present invention has an excellent anti-soil redeposition property in comparison with conventional polymers.

The invention claimed is:

1. An amino group-containing polymer comprising:
a structural unit (a) derived from a monomer (A); and
a structural unit (b) derived from a monomer (B),
the monomer (A) being an amino group-containing monomer represented by the formula (1):

(1)

wherein $R^1$ represents a hydrogen atom or a methyl group; $R^2$ represents a methylene group, an ethylene group, or a direct bond; either of $Y^1$ and $Y^2$ represents a hydroxyl group; and the other represents a structure represented by the formula (2) or (3):

(2)

(3)

wherein $R^3$, $R^4$, and $R^5$ are the same as or different from each other and each represents a hydrogen atom or an organic group containing 1 to 20 carbon atoms, $R^3$ and $R^4$ may be bonded to each other to form a cyclic structure, $X^{1-}$ represents a counter anion, $R^6$ and $R^7$ are the same as or different from each other and each represents a hydrogen atom or an organic group containing 1 to 20 carbon atoms, and $R^6$ and $R^7$ may be bonded to each other to form a cyclic structure,
the monomer (B) being a monomer (B-1) and/or a monomer (B-2),
the monomer (B-1) being a hydroxyalkyl (meth) acrylate monomer,
the monomer (B-2) being an aminoalkyl (meth) acrylate other than the monomer (A), and
the amino group-containing polymer comprising the structural unit (a) in an amount of 1% to 20% by mass and the structural unit (b) in an amount of 80% to 99% by mass, for 100% by mass of a total of structural units derived from all monomers forming the amino group-containing polymer.

2. A method for producing an amino group-containing polymer comprising:
a step of polymerizing a monomer (A) and a monomer (B), the monomer (A) being an amino group-containing monomer represented by the formula (1):

(1)

wherein $R^1$ represents a hydrogen atom or a methyl group; $R^2$ represents a methylene group, an ethylene group, or a direct bond; either of $Y^1$ and $Y^2$ represents a hydroxyl group; and the other represents a structure represented by the formula (2) or (3):

(2)

(3)

wherein $R^3$, $R^4$, and $R^5$ are the same as or different from each other and each represents a hydrogen atom or an organic group containing 1 to 20 carbon atoms, $R^3$ and $R^4$ may be bonded to each other to form a cyclic structure, $X^{1-}$ represents a counter anion, $R^6$ and $R^7$ are the same as or different from each other and each represents a hydrogen atom or an organic group containing 1 to 20 carbon atoms, and $R^6$ and $R^7$ may be bonded to each other to form a cyclic structure,
the monomer (B) being a monomer (B-1) and/or a monomer (B-2),
the monomer (B-1) being a hydroxyalkyl (meth) acrylate monomer,
the monomer (B-2) being an aminoalkyl (meth) acrylate other than the monomer (A), and
an amount of the monomer (A) is 1% to 20% by mass and an amount of the monomer (B) is 80% to 99% by mass, for 100% by mass of a total of all monomers.

3. A detergent composition, comprising:
the amino group-containing polymer according to claim 1.

* * * * *